(12) United States Patent
Fox, Jr.

(10) Patent No.: US 10,723,468 B1
(45) Date of Patent: *Jul. 28, 2020

(54) PARACHUTE INLET CONTROL SYSTEM AND METHOD

(71) Applicant: Roy L. Fox, Jr., Belleville, WV (US)

(72) Inventor: Roy L. Fox, Jr., Belleville, WV (US)

(*) Notice: Subject to any disclaimer, the term of this patent is extended or adjusted under 35 U.S.C. 154(b) by 0 days.

This patent is subject to a terminal disclaimer.

(21) Appl. No.: 16/870,563

(22) Filed: May 8, 2020

Related U.S. Application Data

(63) Continuation of application No. 16/518,610, filed on Jul. 22, 2019.

(60) Provisional application No. 62/701,999, filed on Jul. 23, 2018.

(51) Int. Cl.
| | | |
|---|---|---|
| *B64D 17/02* | (2006.01) | |
| *B64D 17/74* | (2006.01) | |
| *B64D 17/34* | (2006.01) | |

(52) U.S. Cl.
CPC ............ *B64D 17/02* (2013.01); *B64D 17/343* (2013.01); *B64D 17/74* (2013.01)

(58) Field of Classification Search
CPC ........ B64D 17/02; B64D 17/04; B64D 17/08; B64D 17/14; B64D 17/16; B64D 17/343; B64D 17/386; B64D 17/64; B64D 17/66; B64D 17/68; B64D 17/74
See application file for complete search history.

(56) References Cited

U.S. PATENT DOCUMENTS

| | | | | | |
|---|---|---|---|---|---|
| 4,117,994 A | * | 10/1978 | Webb | ................... | B64D 17/343 244/152 |
| 4,955,564 A | * | 9/1990 | Reuter | ................. | B64D 17/343 244/142 |
| 5,205,517 A | * | 4/1993 | Reuter | ................. | B64D 17/343 244/145 |
| 8,096,509 B2 | * | 1/2012 | Fox, Jr. | .................. | B64D 17/74 244/150 |

* cited by examiner

*Primary Examiner* — Richard R. Green
(74) *Attorney, Agent, or Firm* — Snell & Wilmer L.L.P.

(57) ABSTRACT

A parachute inlet control system is configured to provide an improved inflation profile for solo and/or clustered parachutes. An inlet parachute is coupled to a main parachute via a plurality of inlet control suspension lines and/or reefing rings. The inlet control suspension lines may be passed through the reefing rings and coupled to an anchor point below the main parachute. The inlet parachute is located in the inlet area of the main parachute, and causes the inlet of the main parachute to rapidly form a desirable shape. The inlet parachute and inlet control suspension lines function as a reefing system to prevent full inflation of the main parachute until a reefing cutter has functioned. In this manner, parachute failures, such as those due to leading and/or lagging parachutes in a parachute cluster, may be reduced or eliminated.

18 Claims, 19 Drawing Sheets

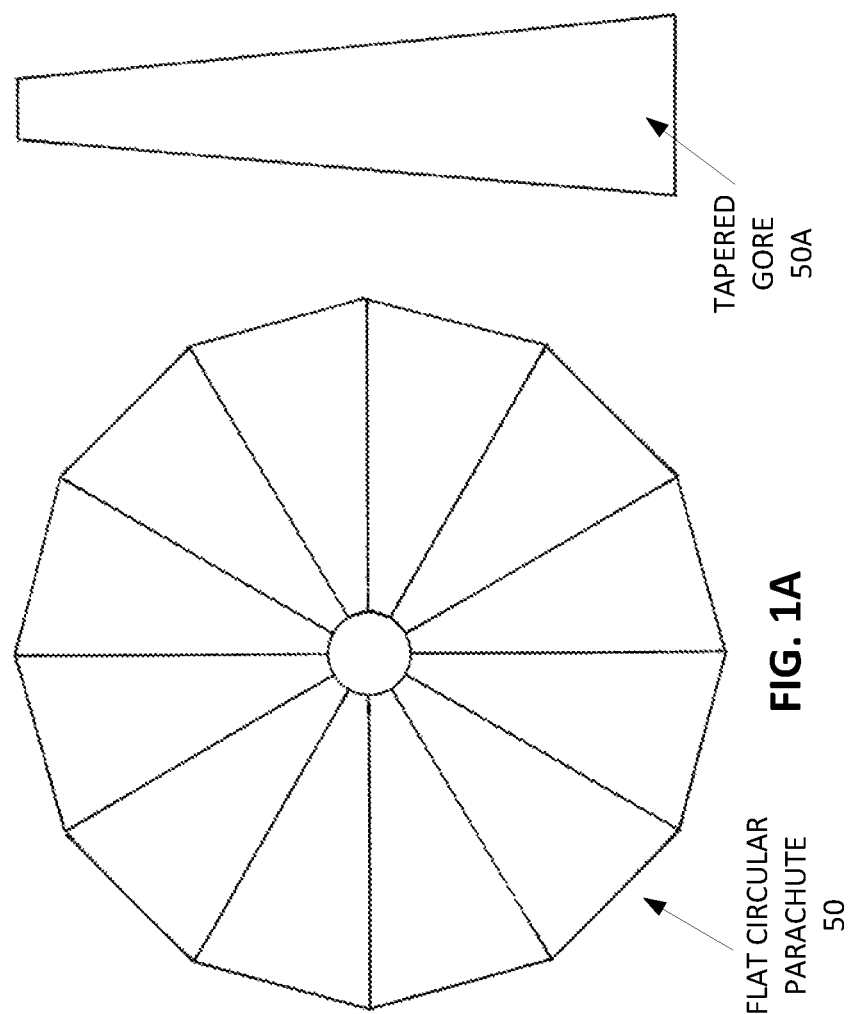

PARACHUTE INLET CONTROL SYSTEM AND METHOD

CROSS-REFERENCE TO RELATED APPLICATIONS

This application is a continuation of U.S. Ser. No. 16/518,610 filed on Jul. 22, 2019, now U.S. Patent Application Publication No. 2020-0023978 entitled "PARACHUTE INLET CONTROL SYSTEM AND METHOD." U.S. Ser. No. 16/518,610 is a non-provisional of, and claims priority to and the benefit of, U.S. Ser. No. 62/701,999 filed Jul. 23, 2018 and entitled "PARACHUTE INLET CONTROL SYSTEM AND METHOD." Each of the foregoing applications is hereby incorporated by reference in the entirety for all purposes.

TECHNICAL FIELD

The present disclosure relates to parachutes, and more particularly to large-scale parachutes deployed solo or in clusters to support heavy and/or bulky payloads.

BACKGROUND

Large cargo parachutes are typically constructed to have a flat disc canopy of approximately 100 feet in diameter, although some are smaller and a few are larger. A 100-foot diameter cargo parachute may typically be used for recovering an aerial delivered payload having a weight range from approximately 2,500 pounds to 5,000 pounds. Payloads of less than approximately 2,500 pounds would most often use a cargo parachute having a smaller diameter. If the payload weight is between approximately 5,000 pounds and 10,000 pounds, another 100-foot diameter parachute is typically added beside the original parachute. The resulting arrangement is known as a 2-chute cluster. Similarly, payload weights of between approximately 10,000 pounds and 15,000 pounds typically use three 100-foot diameter parachutes as a 3-chute cluster. Further, each approximately 5,000-pound payload weight increase typically requires an additional 100-foot diameter parachute.

The initial inflation phase of parachute deployment is typically quite dynamic and somewhat chaotic. Therefore, a typical 2-chute parachute cluster will have more inflation difficulties than will a single parachute, and each additional parachute added to a cluster further increases the potential for a parachute to fail. Because of these issues, a parachute cluster having more than eight 100-foot diameter parachutes is extremely unusual. Primarily, the problems begin with what are referred to as "leading" and/or "lagging" parachutes.

If one of the parachutes in a cluster is slow to initially ingest air (a "lagging" parachute), other inflating parachutes may block its air inlet area and it may not inflate at all. If one or more parachutes in a cluster fail to inflate, the rate of descent for the payload will be higher than desired. The payload may be damaged or destroyed at landing.

Conversely, if one parachute in a cluster of parachutes ingests air in advance of the others within a cluster (a "leading" parachute), it may become overloaded and rupture. If another parachute then leads, it too may overload and rupture. A chain reaction may follow until all parachutes in the cluster have catastrophically failed.

In an attempt to minimize these and other parachute inflation problems, large cargo parachutes are typically equipped with a "reefing" system to provide some control to the initial parachute inflation stage. A typical reefing system consists of a series of reefing rings attached circumferentially around the periphery of the parachute canopy, a reefing line, and a reefing line cutter. The reefing line is passed through the reefing rings, and prevents the parachute canopy from opening fully. Therefore, this conventional reefing system is somewhat analogous to a set of trouser belt loops, having a belt sequentially threaded through them, with the belt tightly cinched until the reefing line cutter severs it. Once the reefing line is severed, the parachute is no longer restrained by the reefing line and the parachute is permitted to fully inflate. Even with a reefing system, however, initial inflation of individual parachutes in a parachute cluster is somewhat random, and many parachute failures still occur.

Additionally, typical aerial delivery operations occur at relatively low altitudes. Therefore, reefing line cutters having short delays, such as about 2.0 seconds, are typically used. But, within a particular cluster of parachutes, these relatively short reefing times often do not provide a sufficient time interval for the reefing systems to provide optimal control of the individual parachute canopy air inlets before the reefing cutters sever their reefing lines. Delaying the disreefing event, for example by incorporating longer delay reefing cutters, may allow more time for the individual reefing systems to provide better initial parachute inflation control, but may also allow the payload to reach the ground surface before full inflation of the parachutes can occur. Therefore, while longer reefing times may improve the success rate of some aerial delivery systems, the altitude from which the aerial delivery operation occurs must be increased to allow more reefing time. This is generally an undesirable option, because most aerial delivery operations are conducted as part of larger military operations. Thus, factors other than parachute reefing times play a significant role in selecting the preferred aerial delivery altitude.

Therefore, it remains desirable to achieve a greater degree of control over the inflation process for solo and/or clustered parachutes, for example parachutes utilized for aerial delivery operations.

SUMMARY

A parachute inlet control system and methods for use are disclosed. In an exemplary embodiment, a parachute inlet control system for facilitating controlled inflation of a main parachute comprises a parachute component comprising an inlet parachute, a reefing component comprising a plurality of inlet control suspension lines coupled between the inlet parachute and an anchor point and configured to couple the inlet parachute to a main parachute, and a release component comprising a reefing cutter configured to allow separation of the inlet parachute from the main parachute.

In another exemplary embodiment, a method for inflating a parachute comprises providing an inlet parachute, and coupling the inlet parachute to a main parachute by threading inlet control suspension lines coupled to the inlet parachute through reefing rings coupled to the main parachute. The inlet parachute is configured to inflate within the inlet area of the main parachute. The method may further comprise activating a reefing cutter to allow separation of the inlet parachute from the main parachute, allowing the inlet parachute to deflate and the main parachute to fully inflate.

In another exemplary embodiment, a parachute system comprises a main parachute comprising a main parachute canopy, a plurality of reefing rings coupled to the main parachute canopy, and a plurality of main parachute suspension lines coupled to the main parachute canopy, and an inlet parachute comprising an inlet parachute canopy and a plurality of inlet control suspension lines coupled to and between the inlet parachute canopy and an anchor point. The plurality of inlet control suspension lines may be threaded through the plurality of reefing rings such that the inlet parachute is coupled to the main parachute. The parachute system may further comprise a release component comprising a reefing cutter configured to allow separation of the inlet parachute from the main parachute.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 1A illustrates a bottom view of a flat circular parachute.

DETAILED DESCRIPTION

The following description is of various exemplary embodiments only, and is not intended to limit the scope, applicability, or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for parachute construction, grouping, deployment, recovery, reefing, disreefing, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical parachute inlet control system.

Primarily because of construction costs, a common generally circular parachute type is constructed as a polygon, but is known as a flat circular parachute, and is typically constructed from tapered gores 50A forming a flat-disc parachute canopy, as depicted by FIG. 1A. The flat circular parachute 50 canopy has an inflated diameter that is about two-thirds (⅔) of its constructed diameter. However, during initial inflation, flat circular parachute 50 can momentarily "over-inflate" and nearly reach its flat-disc constructed diameter if the parachute is not reefed. This is undesirable, because very high forces are developed during such an over-inflation occurrence. The parachute in question may fail under the high forces. Additionally, the payload may be damaged or disturbed.

Figure 1B:
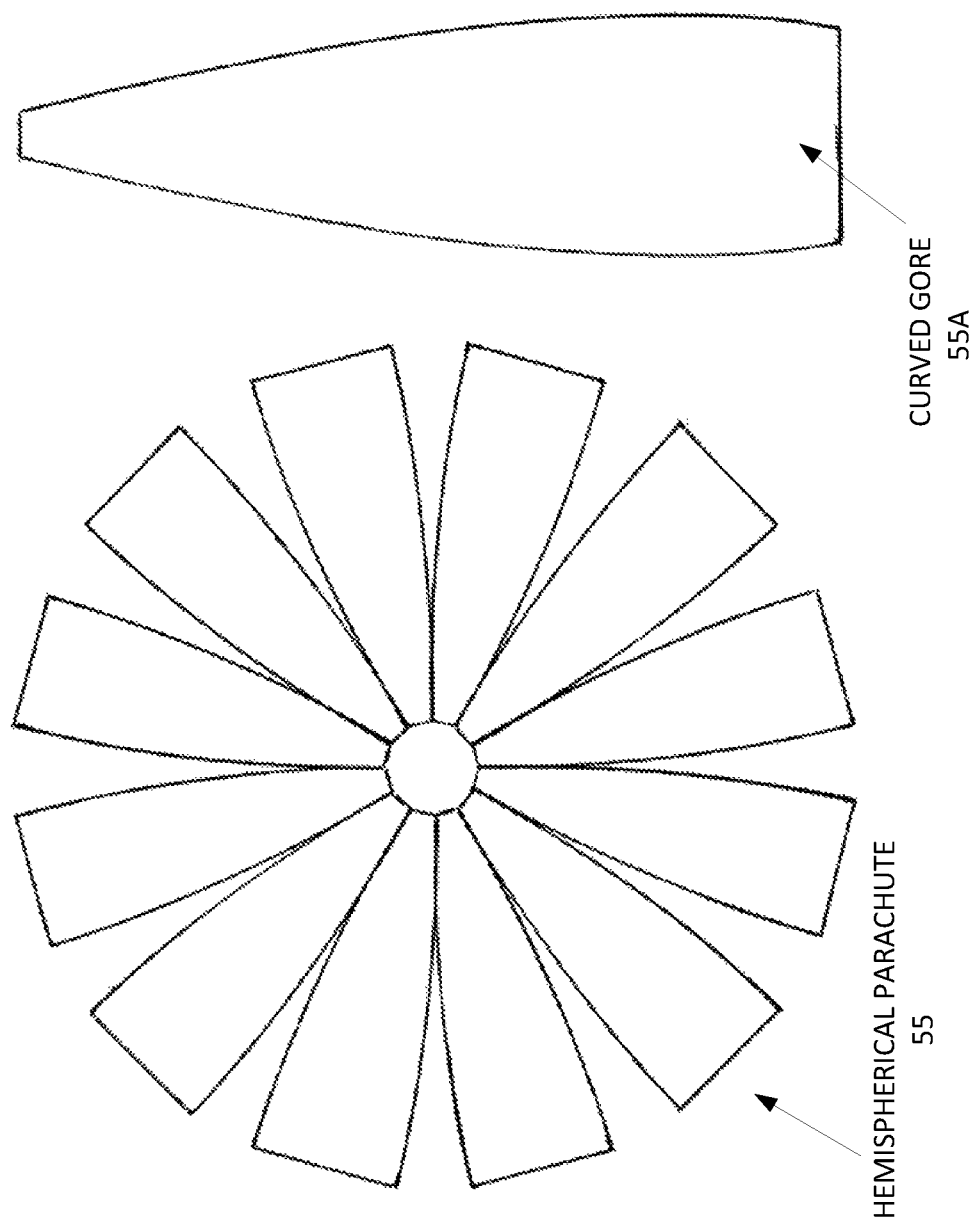
FIG. 1B illustrates a hemispherical parachute.

Turning to FIG. 1B, a generally hemispherical parachute canopy, such as the canopy of hemispherical parachute 55, may be constructed with known gore-shaping components, for example via use of curved gores 55A. Hemispherical parachute 55 typically has a constructed diameter which is nearly equal to its inflated diameter. While a hemispherical parachute is less prone to over-inflation than a flat circular parachute, a hemispherical parachute may still overinflate, and may also still become a leading and/or a lagging parachute when deployed in a parachute cluster.

Figure 1C:
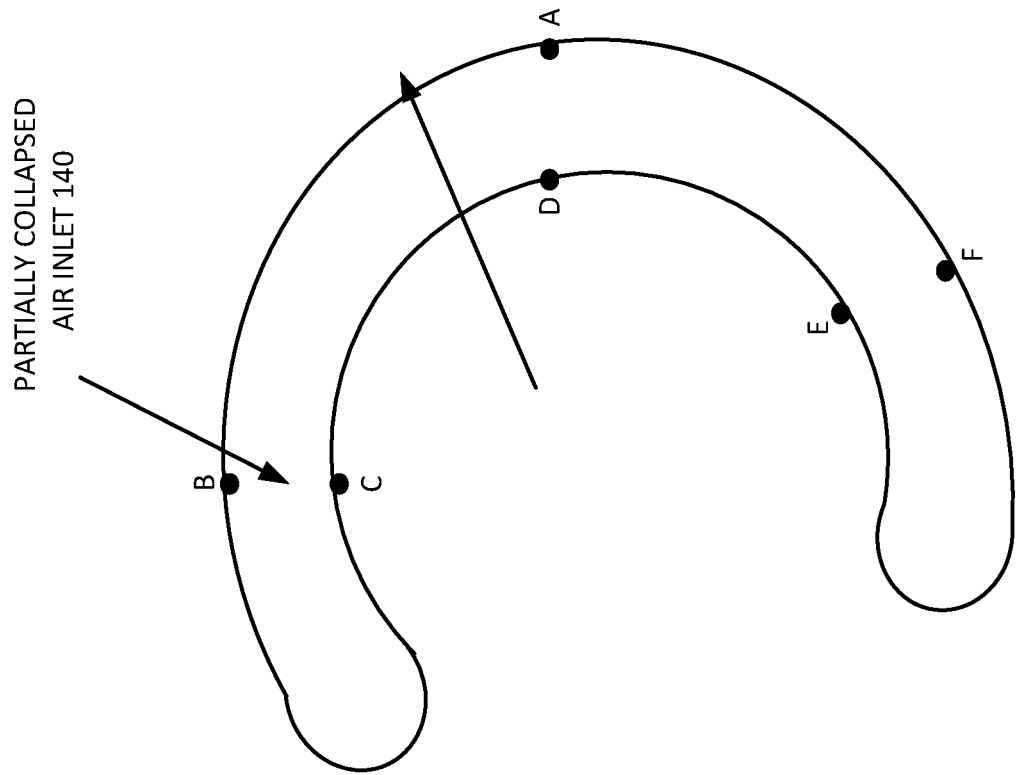
FIG. 1C illustrates various parachute air inlet shapes.
Figure 1C:
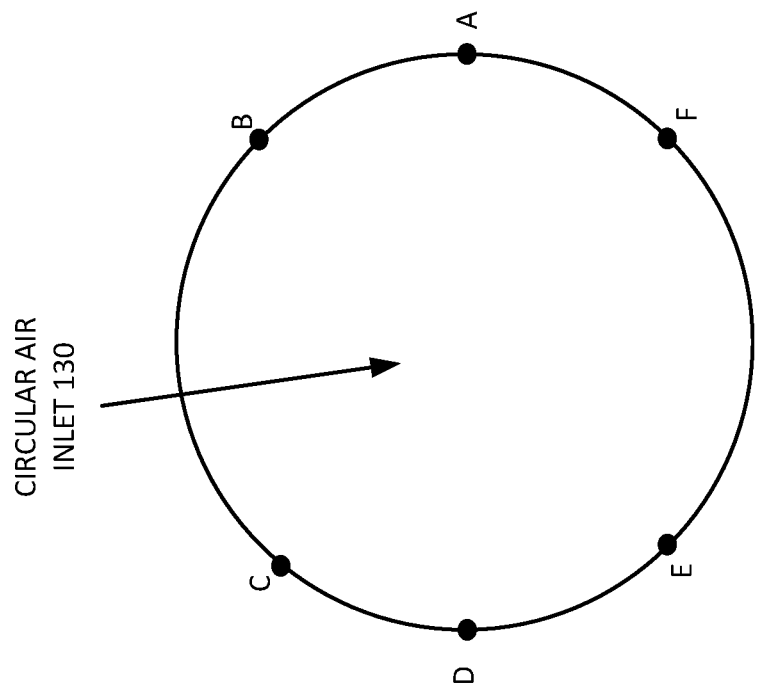

With reference now to FIG. 1C, a substantially circular parachute air inlet 130 is presented. Suspension line attachment points A-F are shown around the periphery of inlet 130. Due to the somewhat chaotic conditions associated with the initial deployment of a parachute, before the parachute canopy skirt has become taut, a portion of the periphery of an air inlet may partially or fully traverse a desired circular air inlet area, as illustrated by partially collapsed air inlet 140. If a portion of the periphery of partially collapsed air inlet 140 passes between suspension lines on another portion of the periphery of partially collapsed air inlet 140 (for example, if suspension line attachment point C and/or D on partially collapsed air inlet 140 passes between suspension line attachment points A and B, as illustrated by the directional arrow in FIG. 1C), a portion of the main parachute canopy may then inflate outside what should be the parachute canopy periphery. This typically results in a parachute malfunction known as a "Mae West."

Figure 1D:
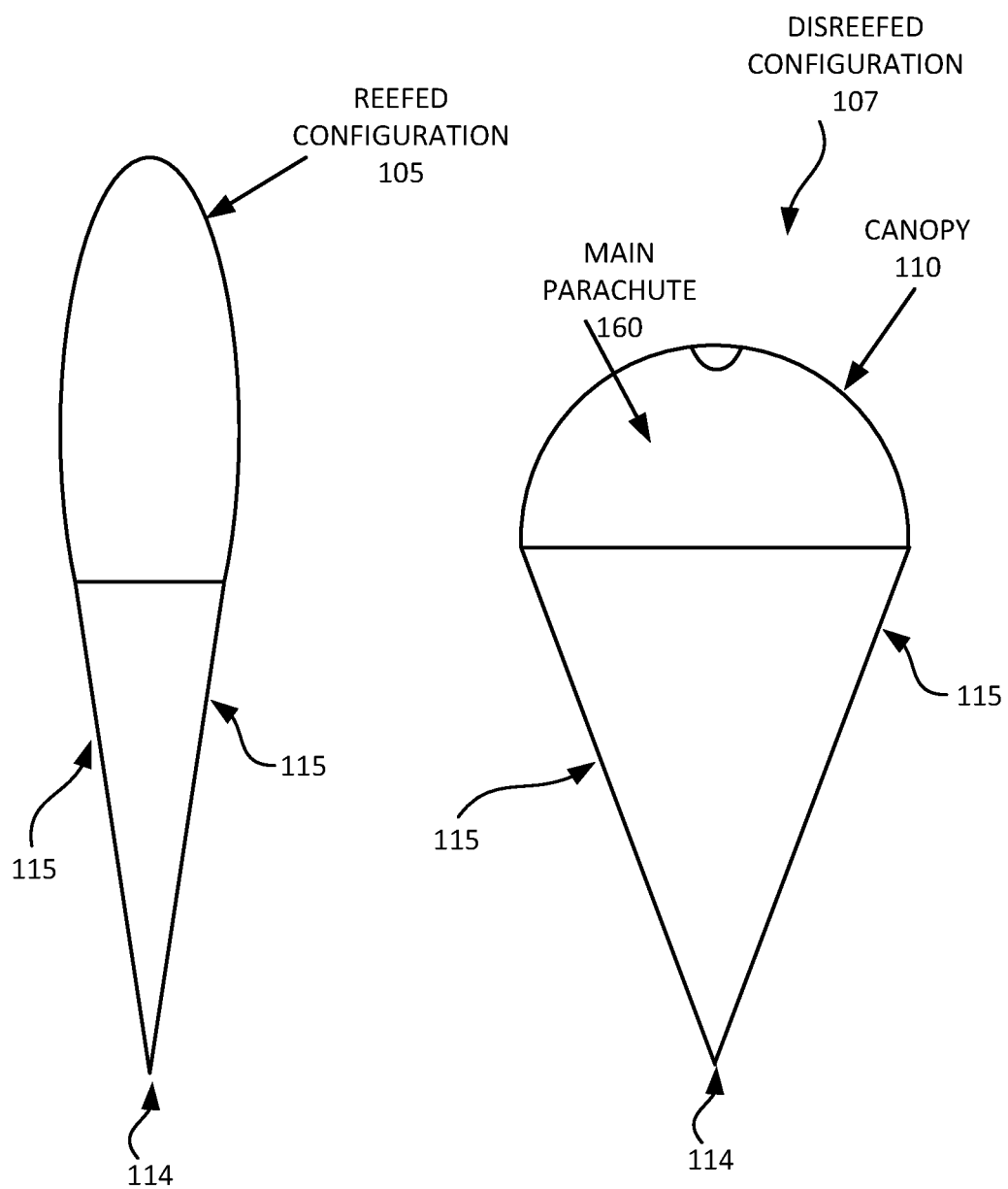
FIG. 1D illustrates a main parachute in a reefed and disreefed configuration in accordance with an exemplary embodiment.

Turning now to FIG. 1D, a parachute, such as main parachute 160, may comprise a canopy 110 and suspension lines 115 coupled to canopy 110, for example, at the edges of canopy 110. Suspension lines 115 may converge (or couple to one another) at a convergence point 114, which may be a payload or coupled to a payload. Additionally, to help a parachute inflate in a controlled manner, a parachute system may comprise a reefing system. A reefing system restricts the inlet size of a parachute (e.g., main parachute 160), and thus prevents the parachute from fully inflating until the reefing system is released. That is, the reefing system retains main parachute 160 in a reefed configuration 105. One goal of a conventional reefing system is prevention of a leading parachute within a parachute cluster. However, conventional reefing systems are inefficient at this task if they do not maintain control of the parachute canopy inlet long enough for each canopy in a parachute cluster to form a symmetrical, fully reefed shape. Moreover, conventional reefing systems have no means to encourage a lagging parachute to catch up to any other parachute in the parachute cluster. Accordingly, a parachute inlet control system may be provided in order to control, guide, and/or otherwise influence inflation, reefing, and/or disreefing of one or more main parachutes.

A parachute inlet control system may be any system configured to facilitate controlled inflation, reefing, and/or disreefing of a main parachute. In accordance with an exemplary embodiment, and with reference to FIG. 1E, a parachute inlet control system 101 generally comprises a parachute component 101A, a reefing component 101B, and a release component 101C. Parachute component 101A may comprise an inlet parachute that is configured to provide a force to inflate, shape, and/or otherwise facilitate, control, and/or guide opening of the intake vent of a main parachute. Reefing component 101B is coupled to parachute component 101A, may comprise a plurality of inlet control suspension lines coupled to the inlet parachute, and is configured to restrict the opening of the intake vent of a main parachute beyond a desired point (for example, beyond a desired intake vent diameter, size and/or area). Release component 101C is coupled to parachute component 101A and/or reefing component 101B, and is configured to sever, cut, and/or otherwise facilitate at least partial separation of parachute inlet control system 101 from a main parachute.

Figure 1E:
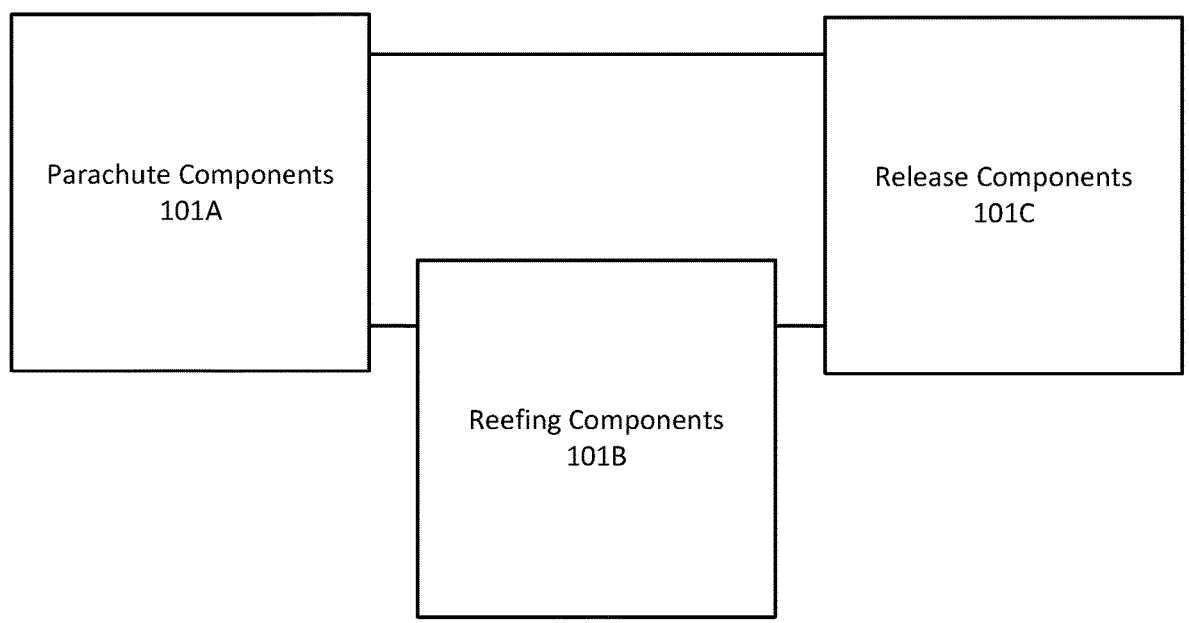
FIG. 1E illustrates a block diagram of a parachute inlet control system in accordance with an exemplary embodiment.

Through use of a parachute inlet control system, such as parachute inlet control system 101 in FIG. 1E, various shortcomings of conventional parachutes and parachute clusters may be overcome. Leading and lagging parachutes may be reduced and/or eliminated. Over-inflation of circular parachutes may be prevented. "Mae West" malfunctions and other parachute inlet anomalies may be reduced and/or prevented. Additionally, parachute inlet control system 101 may be configured to enable these benefits for main parachutes lacking a center line, as well as for main parachutes having a center line.

Certain principles of the present disclosure are related to principles disclosed in U.S. Pat. Nos. 8,096,509 and 8,210, 479, each to Fox, the contents of which are hereby incorporated by reference in their entirety for all purposes (except for any definitions, subject matter disclaimers or disavowals, and except to the extent that the incorporated material is inconsistent with the express disclosure herein, in which case the language in this disclosure controls).

Figure 2:
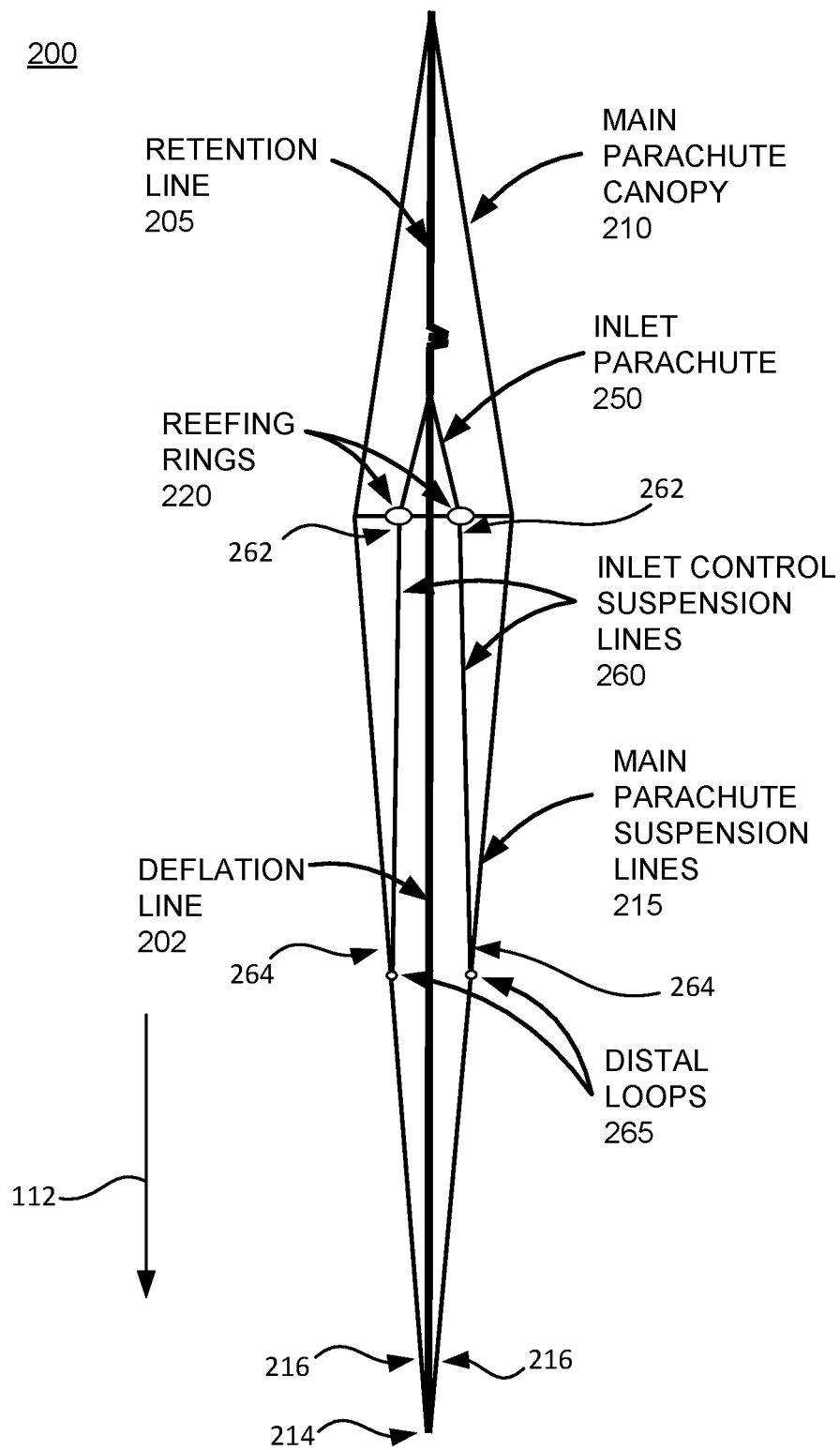
FIG. 2 illustrates a parachute system prepared for packing in accordance with an exemplary embodiment.

With reference to FIG. 2, a parachute system 200 is depicted in a configuration prepared for packing. Parachute system 200 may comprise a main parachute comprising a main parachute canopy 210, main parachute suspension lines 215 being coupled to main parachute canopy 210 at a proximal main suspension line end and extending in a downward direction 112. "Downward direction," as used herein, may refer to the general direction in which main parachute suspension lines extend from the main parachute canopy to a coupled payload when the main parachute is in operation (i.e., inflated to deliver a payload). Main parachute suspension lines 215 may comprise distal main line ends 216, which may converge at a convergence point 214 and/or couple to a payload. Convergence point 214 may be a payload, or coupled to a payload. In various embodiments, main parachute suspension lines 215 may couple to each other at convergence point 214 (e.g., directly, or via a loop or the like), and/or may couple to a payload. Reefing rings 220 may be coupled to or comprised in (e.g., disposed through) main parachute canopy 210, or at any other suitable location on the main parachute (e.g., on main parachute suspension line 215, other components coupled to main parachute canopy 210, etc.). In various embodiments, lanyards may be coupled to main parachute canopy 210, and the lanyards may comprise reefing rings (similar to reefing rings 220) coupled to distal ends of the lanyards.

Parachute system 200 may further comprise a parachute inlet control system comprising an inlet parachute 250 and inlet control suspension lines 260 coupled to inlet parachute 250 and extending in downward direction 112. As used herein, "inlet parachute" may refer to the inlet parachute canopy, or the inlet parachute comprising a canopy and inlet control suspension lines. Inlet control suspension lines 260 each may comprise a proximal inlet suspension line end 262 coupled to inlet parachute 250 and a distal inlet suspension line end 264 coupled to an anchor point on parachute system 200 in the downward direction 112 from inlet parachute 250. A distal inlet suspension line end 264 may be the point at which inlet control suspension lines 260 couple to the anchor point, which may or may not be at an end of inlet control suspension lines 260. The anchor point may be any point of parachute system 200 to which distal inlet suspension line ends 264 of inlet control suspension lines 260 couple such that, during operation, inlet parachute 250 is coupled to main parachute canopy 210 and may inflate. The anchor point may be configured to couple to distal inlet suspension line ends 264 and hold distal inlet suspension line ends 264 in place in response to inlet control suspension lines 260 being under tension, for example during operation of a parachute inlet control system. The anchor point may be coupled to at least one of inlet parachute 250 and/or main parachute canopy 210 (e.g., by being disposed on a suspension line, deflation line, anchor line, or the like). For example, the anchor point to which distal inlet suspension line ends 264 couple may be coupled to and/or disposed on main parachute suspension lines 215. Distal inlet suspension line ends 264 of inlet control suspension lines 260 each may comprise a distal loop 265 to facilitate coupling to the anchor point. In various embodiments, main parachute suspension lines 215 may comprise coupling loops to facilitate coupling to inlet control suspension lines 260, and/or to any other suitable component of parachute system 200 (e.g., a deflation line or anchor line).

In various embodiments, parachute system 200 may comprise a deflation line 202 coupled to inlet parachute 250 and extending in downward direction 112. The end of deflation line 202 not coupled to inlet parachute 250 may be coupled to a payload, a main parachute suspension line 215, or any other point to anchor deflation line 202. Deflation line 202 may be configured to restrict the movement of inlet parachute 250 after separation from main parachute canopy 210 so inlet parachute 250 does not contact main parachute canopy 210 (e.g., as a ball of high pressure air) and may deflate without running the risk of damaging main parachute canopy 210.

In various embodiments, parachute system 200 may comprise a retention line 205 coupled to, and extending between, main parachute canopy 210 and inlet parachute 250. Retention line 205 may be coupled to an apex of inlet parachute 250 and/or main parachute canopy 210. Retention line 205 may be configured to maintain inlet parachute 250 within main parachute canopy 210 after deflation of inlet parachute 250. As such, inlet parachute 250 may remain with parachute system 200 for easy recovery. Retention line 205 may be designed such that there is slack in retention line 205 between main parachute canopy 210 and inlet parachute 250 (as depicted in FIG. 2) allowing inlet parachute 250 to fully inflate during operation of parachute system 200. In various embodiments, a parachute system may not comprise a retention line.

Figure 3A:
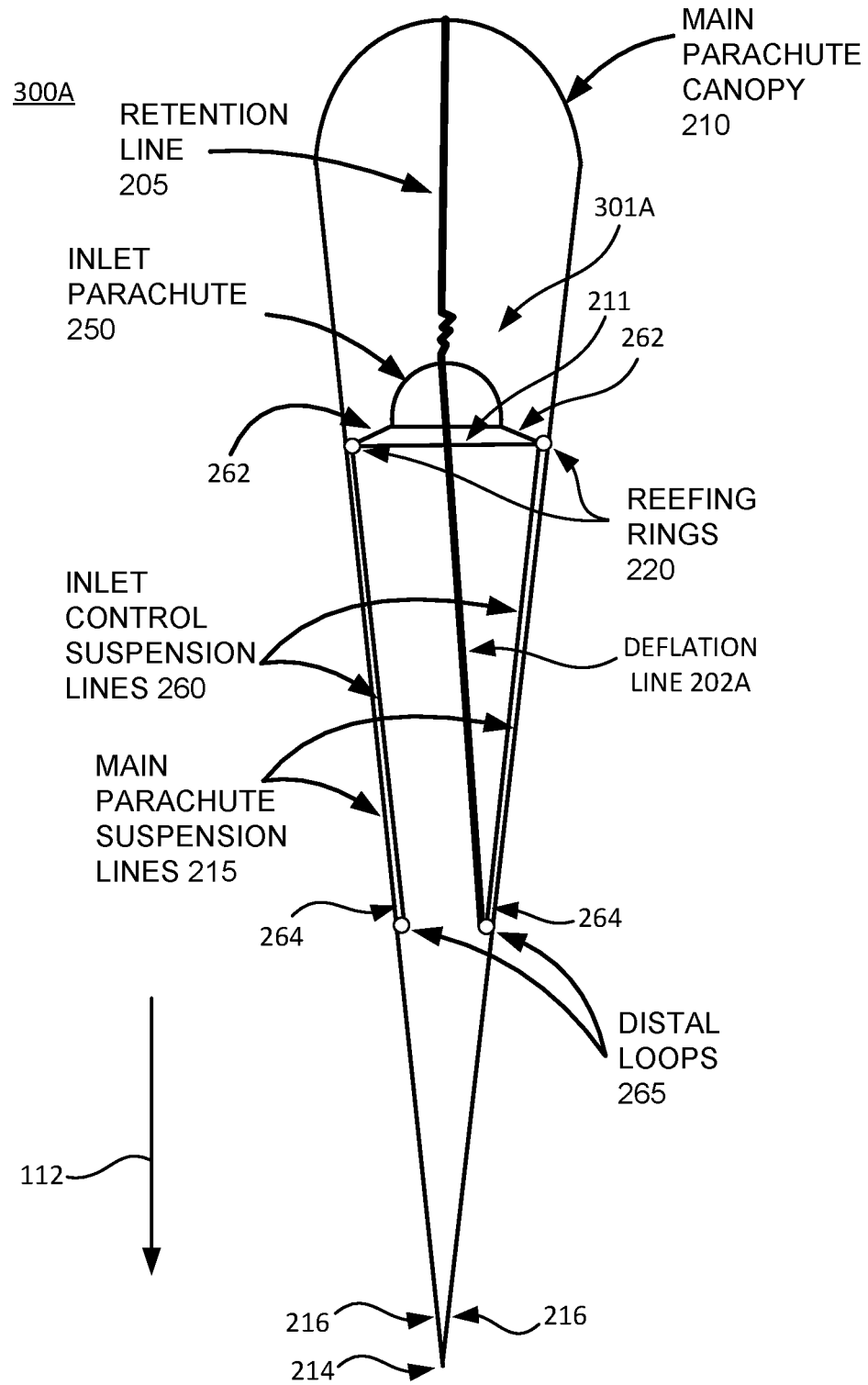
FIG. 3A illustrates a side view of a main parachute in a reefed state coupled to an inlet parachute in accordance with an exemplary embodiment.
Figure 3B:
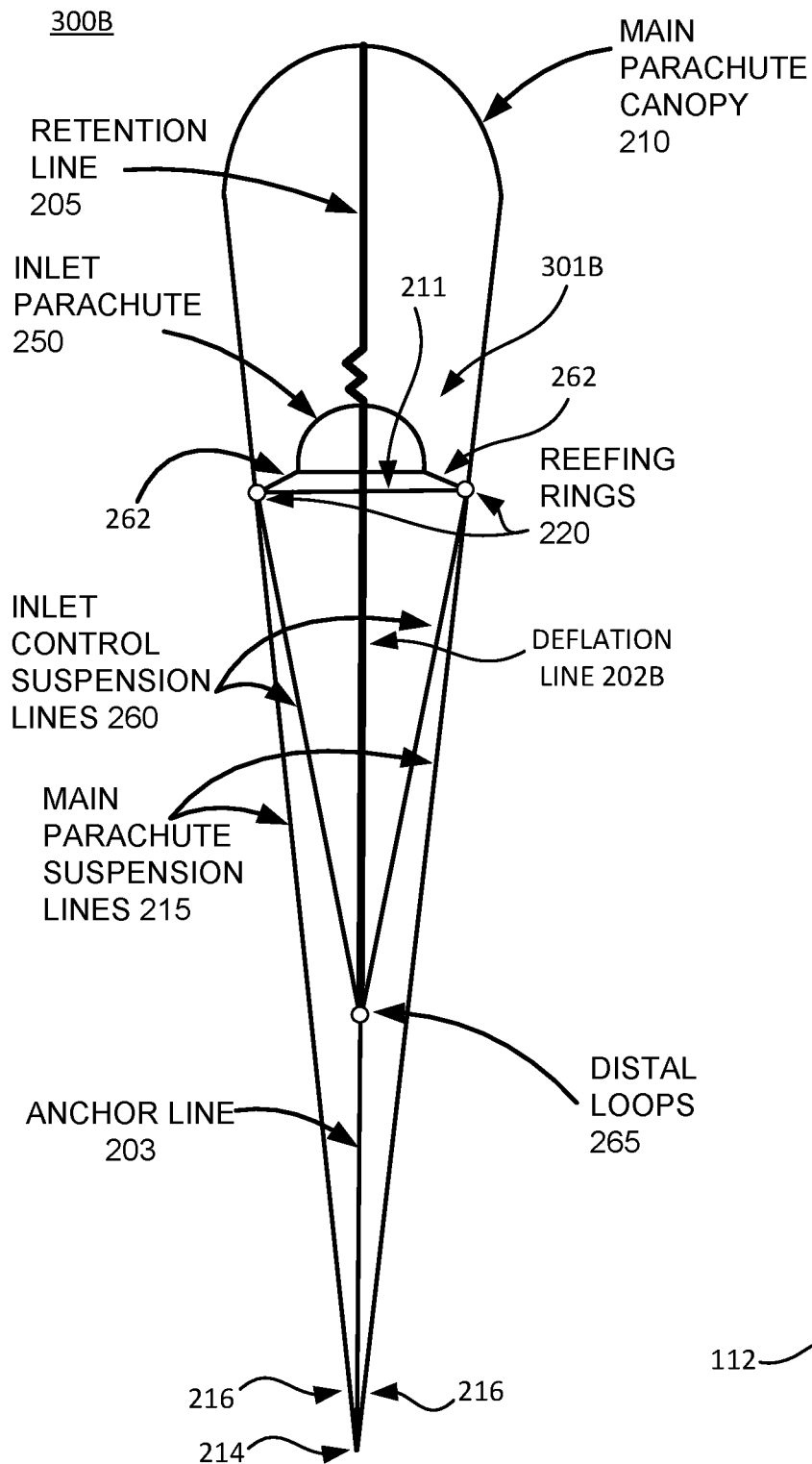
FIG. 3B illustrates a side view of a main parachute in a reefed state coupled to an inlet parachute in another configuration in accordance with an exemplary embodiment.

FIGS. 3A and 3B depict parachute systems 300A and 300B, respectively. Elements with the like element numbering as depicted in other figures throughout, are intended to be the same and may not be repeated for the sake of clarity. Main parachute canopy 210 may be in a reefed configuration (similar to reefed configuration 105 depicted in FIG. 1D) caused by the inflation of inlet parachute 250 and inlet parachute 250 being coupled to main parachute canopy 210 by reefing rings 220 and inlet control suspension lines 260. Parachute inlet control systems 301A and 301B in parachute systems 300A and 300B, respectively, may comprise inlet parachute 250, inlet control suspension lines 260 coupled to inlet parachute 250 and threaded through reefing rings 220 coupled to or disposed through main parachute canopy 210. Proximal inlet suspension line ends 262 may be coupled to inlet parachute 250, and distal inlet suspension line ends 264 may be coupled to an anchor point. The anchor point, for example, may be coupled to and/or disposed on main parachute suspension lines 215, as depicted in parachute system 300A in FIG. 3A. As another example, the anchor point may be coupled to and/or disposed on a deflation line, such as deflation line 202A depicted in FIG. 3A, deflation line 202B depicted in FIG. 3B, and/or deflation line 202 depicted in FIG. 2. As yet another example, the anchor point may be a payload or coupled to and/or disposed on a payload.

In various embodiments, the deflation line may be coupled to main parachute suspension lines 215 (e.g., via a loop coupled to the deflation line and/or main parachute suspension lines 215), as depicted in FIG. 3A. In various embodiments, the deflation line may be coupled to an anchor line 203, as depicted in FIG. 3B. Anchor line 203 and deflation line 202B may be two separate lines coupled together (e.g., by a loop on anchor line 203 and/or deflation line 202B), or anchor line 203 and deflation line 202B may form a single line, such as deflation line 202, depicted in FIG. 2. In various embodiments, anchor line 203 may be separate from the deflation line, and may be a line to which distal inlet suspension line ends 264 (or their distal loops 265) couple (e.g., to provide an anchor point). In various embodiments, a parachute system may not comprise a deflation line.

With continued reference to FIGS. 3A and 3B, in response to parachute systems 300A or 300B being deployed, inlet parachute 250 may inflate. Inlet parachute 250 may comprise any component, structure, materials, and/or mechanisms configured to apply a force to an inlet vent of main parachute canopy 210. In accordance with an exemplary embodiment, inlet parachute 250 comprises a hemispherical or conical parachute. In another exemplary embodiment, inlet parachute 250 comprises a semispherical cruciform parachute, for example a parachute disclosed in U.S. Pat. No. 7,261,258 to Fox. Moreover, inlet parachute 250 may comprise any suitable parachute configured to inflate in the inlet area of main parachute canopy 210.

In an exemplary embodiment, inlet parachute 250 comprises nylon fabric. Additionally, inlet parachute 250 may comprise polyethylene terephthalate (e.g., Dacron®), ultra-high molecular weight polyethelyne (e.g., Spectra®), poly paraphenylene terephthalamide (e.g., Kevlar®), and/or other high-modulus aramid fibers, and the like. For example, inlet parachute 250 may comprise nylon gores coupled to Kevlar® fabric reinforcing portions in various locations. Moreover, inlet parachute 250 may comprise any suitable material or combination of materials configured to inflate in response to movement through an air stream.

In an exemplary embodiment, inlet parachute 250 is coupled to reefing rings 220 via inlet control suspension lines 260. Moreover, inlet parachute 250 may be coupled to main parachute canopy 210 via any suitable mechanism and/or at any suitable location configured to cause the inlet area of main parachute canopy 210 to expand to and/or assume a desired shape.

In accordance with various exemplary embodiments, inlet parachute 250 may be customized for use with a particular main parachute and/or payload. For example, inlet parachute 250's size, shape, configuration, material, vent size, vent location, and/or the like may be configured based on a desired inflation time for main parachute canopy 210. Moreover, inlet parachute 250 may be configured based on any suitable criteria as determined by a user, for example payload size, payload weight, deployment velocity, inlet size of main parachute canopy 210, and/or the like.

Inlet control suspension lines 260 may comprise any suitable material, fabric, rope, cord, and/or the like, configured to releasably couple inlet parachute 250 and main parachute canopy 210. In accordance with an exemplary embodiment, inlet control suspension lines 260 comprise high-strength cord coupled to inlet parachute 250 and main parachute canopy 210 through reefing rings 220. In various exemplary embodiments, inlet control suspension lines 260 comprise Spectra® fiber. In other exemplary embodiments, inlet control suspension lines 260 comprise Kevlar® fiber. Moreover, inlet control suspension lines 260 may comprise any suitable configuration, shape, length, thickness, mass, density, and/or material configured to couple inlet parachute 250 to main parachute canopy 210 and/or reefing rings 220.

In accordance with an exemplary embodiment, each inlet control suspension line 260 may comprise a distal loop 265 to couple to an anchor point. Inlet parachute 250 is coupled to main parachute canopy 210 via inlet control suspension lines 260 threading through reefing rings 220 and coupling to an anchor point. In this manner, inlet parachute 250 may be secured to main parachute canopy 210 and/or reefing rings 220 in a stable configuration. Additionally, in this manner inlet parachute 250 may be rapidly separated from main parachute canopy 210 and/or reefing rings 220 responsive to function of a reefing cutter severing the coupling of inlet control suspension lines 260 from the anchoring point.

Reefing rings 220 may comprise any suitable structure, material, shape, size, and/or configuration to facilitate coupling a main parachute canopy 210 to an inlet parachute 250. In accordance with an exemplary embodiment, a plurality of reefing rings 220 are coupled to main parachute canopy 210 around the periphery of the main parachute canopy 210 air inlet. Reefing rings 220 may comprise metal (e.g., aluminum, steel, titanium, magnesium, and the like, and/or alloys and combinations of the same), plastic, composite, textile, or any other suitable material configured to couple with inlet control suspension lines 260. Reefing rings 220 may be located in any suitable location on main parachute canopy 210. For example, a reefing ring 220 may be located on the main parachute skirt 211 of main parachute canopy 210 at the junction of each radial seam, and/or between adjacent gores and a suspension line. In an exemplary embodiment, one reefing ring 220 is provided for each gore of main parachute canopy 210. In another exemplary embodiment, two reefing rings 220 are provided for each gore of main parachute canopy 210. Moreover, any suitable number of reefing rings 220 may be coupled to main parachute canopy 210 in order to facilitate coupling of main parachute canopy 210 to inlet parachute 250 and/or to control the inflation of main parachute canopy 210.

In various exemplary embodiments, inlet control suspension lines 260 are threaded through reefing rings 220. In an exemplary embodiment, inlet control suspension line 260 is threaded through one reefing ring 220.

Main parachute canopy 210 may comprise any suitable material or combination of material in any suitable configuration to slow the descent of a desired payload. In accordance with an exemplary embodiment, main parachute canopy 210 is configured to slow the descent of a payload through the atmosphere. In various exemplary embodiments, main parachute canopy 210 may be a flat circular parachute, a hemispherical parachute, a cruciform parachute, a conical parachute, or the like. Main parachute canopy 210 may be deployed alone, or may be part of a parachute cluster. Moreover, main parachute canopy 210 may be configured with any suitable components to enable use with a parachute inlet control system, as desired. Main parachute canopy 210 is further configured to inflate responsive to operation of one or more reefing cutters.

Figure 4A:
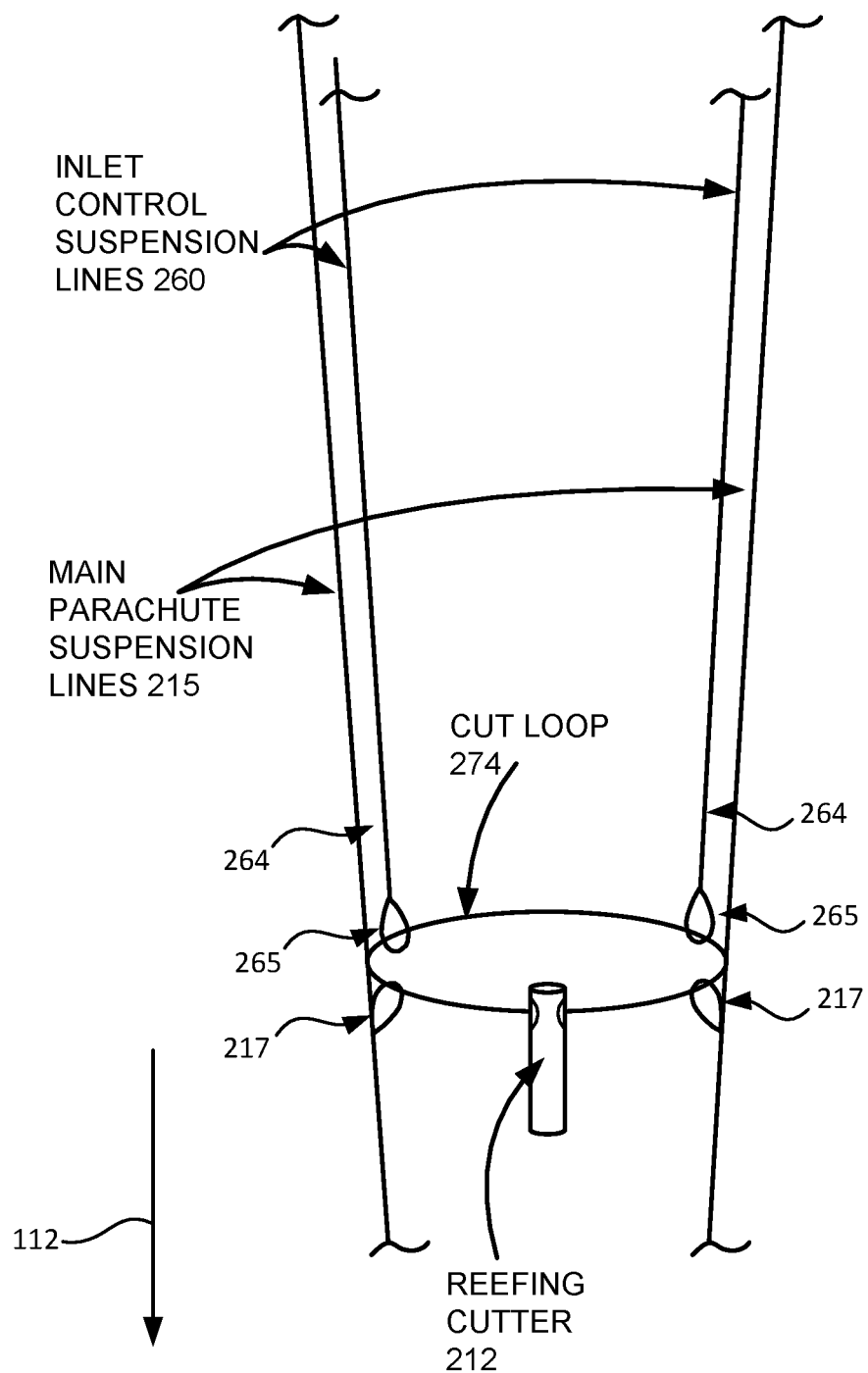
FIG. 4A illustrates the inlet control suspension lines of an inlet parachute coupled to the main parachute suspension lines of a main parachute in accordance with an exemplary embodiment.
Figure 4B:
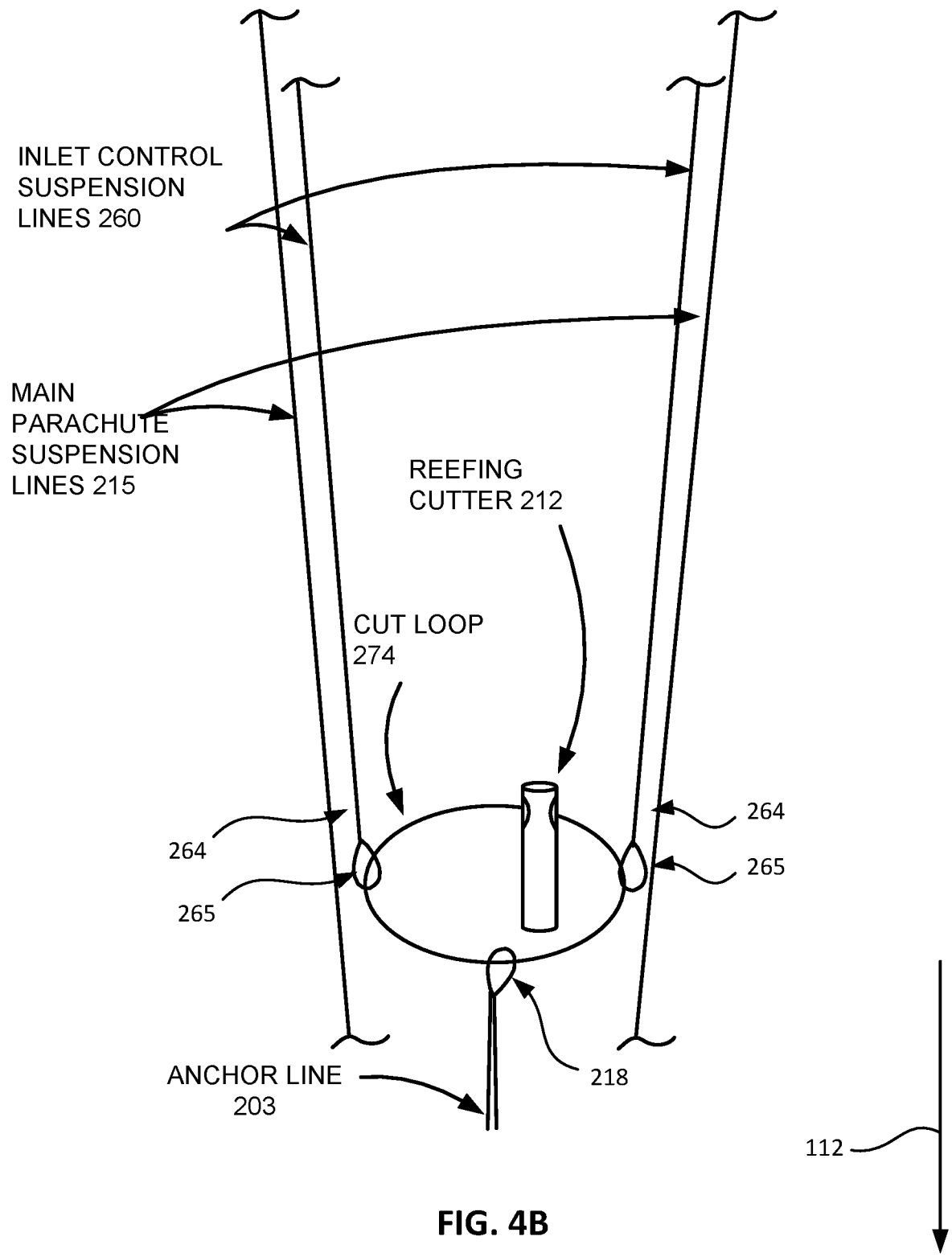
FIG. 4B illustrates the inlet control suspension lines of an inlet parachute coupled to an anchor line in accordance with an exemplary embodiment.

Parachute inlet control systems 301A and 301B in parachute systems 300A and 300B, respectively, may further comprise a release component (e.g., release component 101C depicted in FIG. 1E). With further reference to FIGS. 4A and 4B, the release component may comprise a reefing cutter 212 and/or a cut loop 274. Reefing cutter 212 may comprise any suitable mechanism configured to facilitate at least partial separation of inlet parachute 250 and main parachute canopy 210, for example by severing cut loop 274. Activation of reefing cutter 212 may initiate a disreefing event in which inlet parachute 250 is decoupled from main parachute canopy 210 such that inlet parachute 250 deflates and main parachute canopy 210 may fully inflate.

As depicted in FIGS. 4A and 4B, inlet control suspension lines 260 may be coupled to cut loop 274 at distal inlet suspension line ends 264. Inlet control suspension lines 260 may be coupled to cut loop 274 by distal loops 265 on distal inlet suspension line ends 264. As depicted in FIG. 4A, cut loop 274 may provide an anchor point for inlet control suspension lines 260, as discussed herein, by coupling to main parachute suspension lines 215, and/or to coupling loops 217 coupled to and/or disposed on main parachute suspension lines 215 (e.g., as depicted in FIGS. 2 and 3A). Reefing cutter 212 may be coupled to inlet control suspension lines 260 (e.g., directly, or via cut loop 274), for example at distal inlet suspension line ends 264. Reefing cutter 212 may be coupled to cut loop 274. Reefing cutter 212 may sever cut loop 274, and in response, inlet control suspension lines 260 may be decoupled from their anchor point on main parachute suspension lines 215, decoupling inlet parachute 250 from main parachute canopy 210, and allowing inlet parachute 250 to deflate and main parachute canopy 210 to fully inflate into a disreefed configuration 107 (as depicted in FIG. 1D). As depicted in FIG. 4B, cut loop 274 may provide an anchor point for inlet control suspension lines 260, as discussed herein, by coupling to anchor line 203 (and/or a deflation line), and/or to a coupling loop 218 coupled to and/or disposed on anchor line 203 (or a deflation line, e.g., as depicted in FIG. 3B). In various embodiments, cut loop 274 may be coupled to anchor line 203, a deflation line, and/or one or more main parachute suspension lines 215. Reefing cutter 212 may also be coupled to cut loop 274. Reefing cutter 212 may sever cut loop 274, and in response, inlet control suspension lines 260 may be decoupled from their anchor point on anchor line 203 (or a deflation line), decoupling inlet parachute 250 from main parachute canopy 210, and allowing inlet parachute 250 to deflate and main parachute canopy 210 to fully inflate into a disreefed configuration 107 (as depicted in FIG. 1D).

In various embodiments, one or more inlet control suspension lines 260 may have separate anchor points, and one or more cut loops 274 may be coupled to each inlet control suspension line 260. A parachute system may have any suitable number of anchor points which allow the coupling of inlet parachute 250 to main parachute canopy 210, and any suitable number of cut loops 274 and reefing cutters 212. A reefing cutter 212 may be coupled to each cut loop 274 and/or each inlet control suspension line 260, such that the activation of each reefing cutter 212 may release the respective inlet control suspension line(s) 260.

In accordance with an exemplary embodiment, reefing cutter 212 comprises a pyrotechnic charge configured to force a blade through a cord. In accordance with various exemplary embodiments, reefing cutter 212 is configured to sever cut loop 274 between approximately 1.5 seconds and 5.0 seconds after main parachute canopy 210 is deployed. In another exemplary embodiment, reefing cutter 212 is configured to sever cut loop 274 about 2.0 seconds after main parachute canopy 210 is deployed, wherein the term "about," as used in this context, means plus or minus 0.5 second. Moreover, reefing cutter 212 may be configured to sever cut loop 274 at any suitable time configured to facilitate a desired inflation profile for main parachute canopy 210, and the examples provided herein are by way of illustration and not of limitation.

Additionally, reefing cutter 212 may be configured for remote operation. For example, reefing cutter 212 may be configured with wireless communication components allowing a user to send an operative command, for example an activation command, to reefing cutter 212 and/or other components of the parachute inlet control system. In this manner, a user may monitor the inflation of a main parachute canopy 210, and may trigger operation of reefing cutter 212 once a desired inflation profile for main parachute canopy 210 has been achieved. Additionally, a user may monitor the inflation of multiple main parachute canopies 210 configured as a parachute cluster, and may trigger operation of one or more reefing cutters 212 at a desired time, for example once all main parachute canopies 210 in the parachute cluster have achieved a desired inflation profile. Reefing cutter 212 may also be configured to activate after a predetermined time period (for example, 10 seconds) if an operative command has not been received. Reefing cutter 212 may further be configured to be activated responsive to any suitable condition, for example altitude of a payload, velocity of a payload, atmospheric pressure, temperature, and/or the like, as desired.

With reference to FIGS. 3A and 3B, and in accordance with various exemplary embodiments, parachute canopies generally inflate by allowing air to enter the bottom of the parachute canopy. The air is then trapped inside the canopy, forming a bubble at the parachute top that grows larger and larger, inflating and pressurizing the parachute canopy from top to bottom. Thus, at least partially blocking the air inlet into the canopy of a parachute, for example main parachute canopy 210, by coupling an inlet parachute 250 in this area may seem to be the exact opposite of what is needed to encourage a speedy reefed inflation of main parachute canopy 210. However, small parachutes, such as inlet parachute 250, inflate much more rapidly than large parachutes. Therefore, a small parachute strategically positioned inside the air inlet of main parachute canopy 210 can rapidly inflate and quickly force the air inlet of main parachute canopy 210 into a desirable shape. This is especially true if inlet parachute 250 is constructed of low permeability fabric. Moreover, because inlet control suspension lines 260 coupled to inlet parachute 250 allow the inlet of main parachute canopy 210 to spread to a somewhat larger diameter than that of inlet parachute 250, high velocity air flows around inlet parachute 250, for example in a perpendicular airflow pattern, and fills main parachute canopy 210.

Because the perpendicular component of the air flow around inlet parachute 250 rapidly forces the skirt of main parachute canopy 210 into a desirable shape, main parachute canopy 210 becomes configured to ingest air more uniformly, and thus more rapidly, with inlet parachute 250 in place than without inlet parachute 250 in place. Further, such an approach is very effective in preventing lagging main parachutes in a parachute cluster. In a parachute cluster having main parachutes equipped with a parachute inlet control system, each main parachute canopy air inlet rapidly forms a desirable shape almost simultaneously.

Figure 5A:
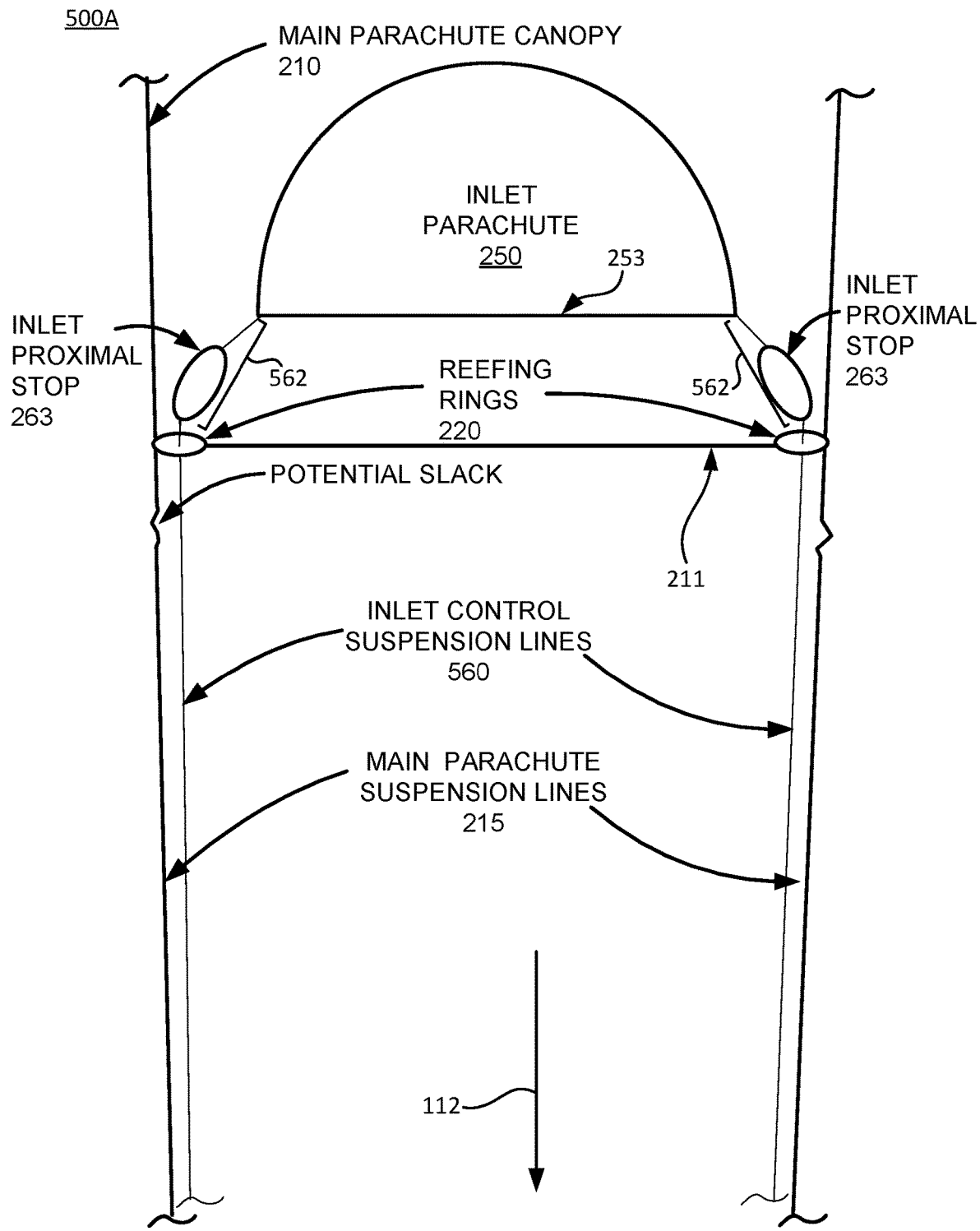
FIG. 5A illustrates a main parachute coupled to an inlet parachute comprising inlet control suspension lines having proximal stops in accordance with an exemplary embodiment.
Figure 5B:
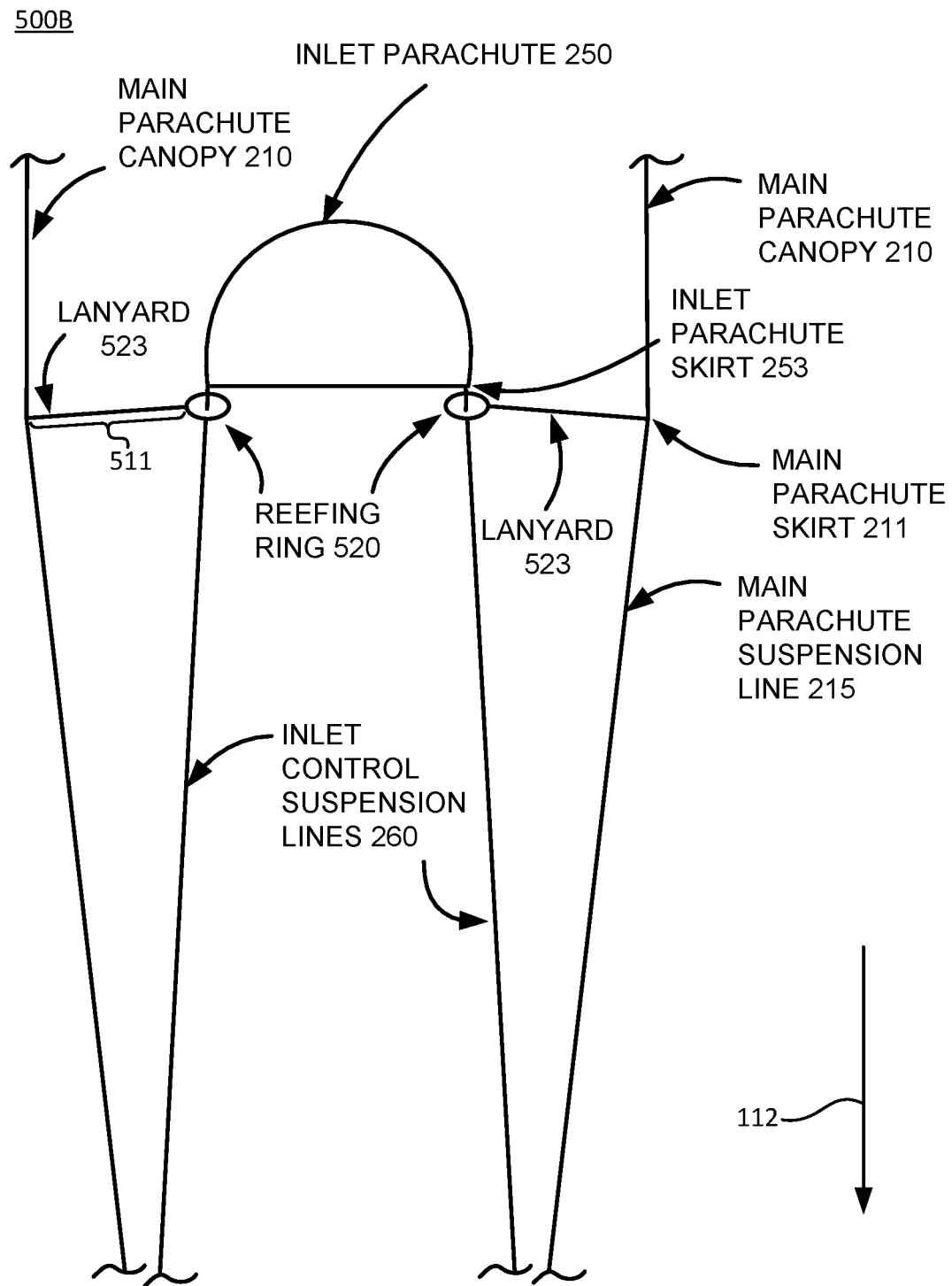
FIG. 5B illustrates a main parachute coupled to an inlet parachute comprising lanyards coupled between the main parachute canopy and the inlet parachute in accordance with an exemplary embodiment.

However, with reference to FIGS. 5A and 5B, during inflation of inlet parachute 250 and main parachute canopy 210, main parachute canopy 210 may create more and more drag, causing main parachute suspension lines 215 to stretch or expand. This may decrease the distance (e.g., horizontal distance) between inlet parachute skirt 253 and main parachute skirt 211, causing less area for air to flow around inlet parachute 250 and into main parachute canopy 210. Parachute systems 500A and 500B, depicted in FIGS. 5A and 5B, respectively, may comprise components to provide a minimum distance between inlet parachute skirt 253 and main parachute skirt 211, such that the distance may not become too small and inhibit airflow into main parachute canopy 210. In accordance with an exemplary embodiment, as depicted in FIG. 5A, inlet control suspension lines 560 may comprise an inlet proximal stop 263 coupled to inlet control suspension lines 560 above (i.e., in a direction opposite of downward direction 112) reefing rings 220. Inlet proximal stop 263 may be disposed on inlet control suspension lines 560 at any suitable spacing distance 562 below (i.e., in downward direction 112) inlet parachute skirt 253 such that the distance between inlet parachute skirt 253 and main parachute skirt 211 may not decrease smaller than such spacing distance 562. That is, as main parachute canopy 210 inflates and possibly expands, main parachute suspension lines 215, reefing rings 220, through which inlet control suspension lines 560 are threaded, will move up (opposite downward direction 112) inlet control suspension lines 560, but cannot get closer to inlet parachute skirt 253 than spacing distance 562.

In accordance with an exemplary embodiment, as depicted in FIG. 5B, lanyards 523 may be coupled to main parachute canopy 210 at one end, and at a distal lanyard end, a reefing ring 520 (similar to reefing rings 220 in FIGS. 3A and 3B) may be coupled to lanyard 523. Lanyards 523 may be coupled to any suitable components such as main parachute suspension lines 215. Inlet control suspension lines 260 may be threaded through reefing rings 520 to couple inlet parachute 250 to main parachute canopy 210. In various embodiments, the length of inlet control suspension lines 260 may be approximately (i.e., within 10%) equal to the portion of main parachute suspension lines 215 corresponding to the length of inlet control suspension lines 260. Lanyards 523 may be any suitable lanyard length 511 to allow inlet parachute 250 to move relative to main parachute skirt 211 without significantly affecting the spacing between inlet parachute skirt 253 and main parachute skirt 211. Thus, there will be a suitable amount of space for air to bypass inlet parachute 250 and flow into main parachute canopy 210.

In various embodiments, inlet parachute skirt 253 may be disposed higher than (i.e., in a direction opposite from downward direction 112) main parachute skirt 211. Such a disposition may be achieved by inlet control suspension lines 260 and main parachute suspension lines 215 having appropriate lengths. As such, air bypassing inlet parachute 250 and flowing perpendicular thereto into main parachute skirt 211 may force main parachute skirt 211 outward, causing the inlet of main parachute canopy 210 to increase and main parachute canopy 210 may receive more air. Therefore, the lengths of the inlet control suspension lines (e.g., inlet control suspension lines 260), in various embodiments, may be longer than the lengths of the relevant portions of main parachute suspension lines 215 corresponding to the inlet control suspension lines to achieve such a configuration.

Additionally, the canopy of inlet parachute 250 can be equipped with one or more vent holes configured to flow air therethrough and into main parachute canopy 210. Thus, inlet parachute 250 does not block air flow into main parachute canopy 210, because inlet parachute 250 rapidly becomes centered in the inlet of main parachute canopy 210, and thus at least partially controls, guides, and/or directs air flow into main parachute canopy 210.

Further, with reference again to FIGS. 3A, 3B, 4A, and 4B, because inlet control suspension lines 260 of inlet parachute 250 are secured to main parachute canopy 210 and/or reefing rings 220 until reefing cutter 212 severs cut loop 274, the parachute inlet control system also serves the function of a conventional reefing line, and thus prevents main parachute canopy 210 from initially over-inflating or otherwise spreading excessively and becoming a leading parachute. Therefore, an exemplary parachute inlet control system facilitates greater control of the inflation and/or operation of main parachute canopy 210. Further, the inflation, reefing, and disreefing events of one or more main parachutes within a parachute cluster may thus achieve a degree of synchronization beyond that which is possible with typical clustered parachute systems.

With additional reference to FIGS. 6A-6D, in response to reefing cutter 212 being activated, a disreefing event occurs, and the coupling between inlet parachute 250 and main parachute canopy 210 is severed because inlet control suspension lines 260 are no longer anchored to an anchor point (e.g., to the main parachute or payload). Therefore, inlet parachute 250 deflates, as seen in the configuration of inlet parachute 250 depicted in FIGS. 6A-6D, pulling inlet control suspension lines 260 upward (in a direction opposite of downward direction 112). The deflation of inlet parachute 250 allows main parachute canopy 210 to fully inflate (as depicted in FIGS. 6A-6D).

Figure 6A:
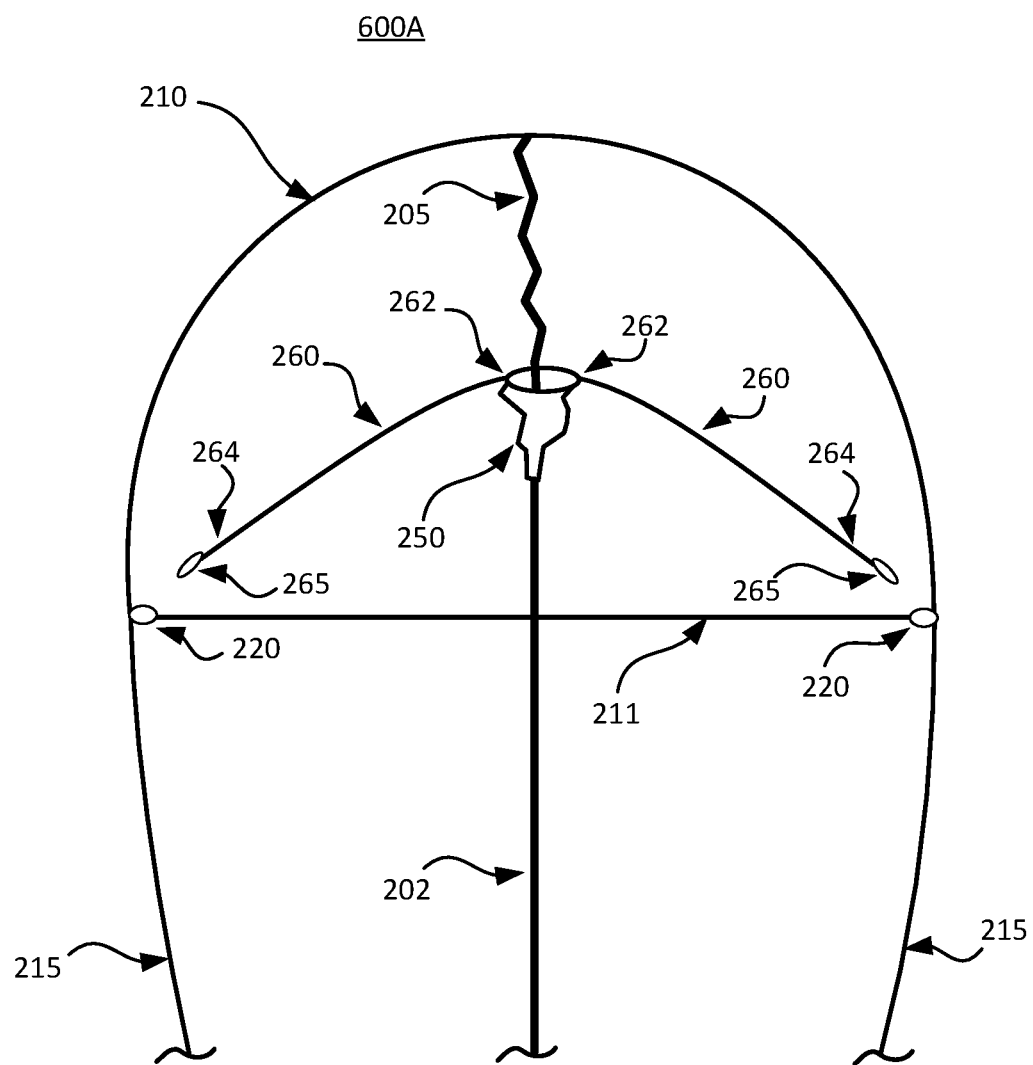
FIG. 6A illustrates a side view of a main parachute in a disreefed state coupled to a deflated inlet parachute having inlet control suspension lines in a first configuration in accordance with an exemplary embodiment.
Figure 6A:
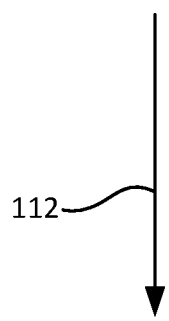

The inlet control suspension lines (e.g., inlet control suspension lines 260 in FIGS. 3A and 3B) of a parachute inlet control system may comprise different configurations to facilitate such a disreefing event. With reference to FIG. 6A depicting parachute system 600A, inlet control suspension lines 260 may comprise distal loops 265 coupled to distal inlet suspension line ends 264. As described herein, distal loops 265 may facilitate coupling inlet control suspension lines 260 to an anchor point and/or a cut loop (e.g., cut loop 274 in FIGS. 4A and 4B). Distal loops 265 may be configured to pass through reefing rings 220 in response to a disreefing event and deflation of inlet parachute 250. Distal loops 265 may comprise a soft material such that distal loops 265 may deform during a disreefing event to fit through reefing rings 220. Therefore, for preparing parachute system 600A for reuse, inlet control suspension lines 260 may be re-threaded through respective reefing rings and coupled to an anchor point.

Figure 6B:
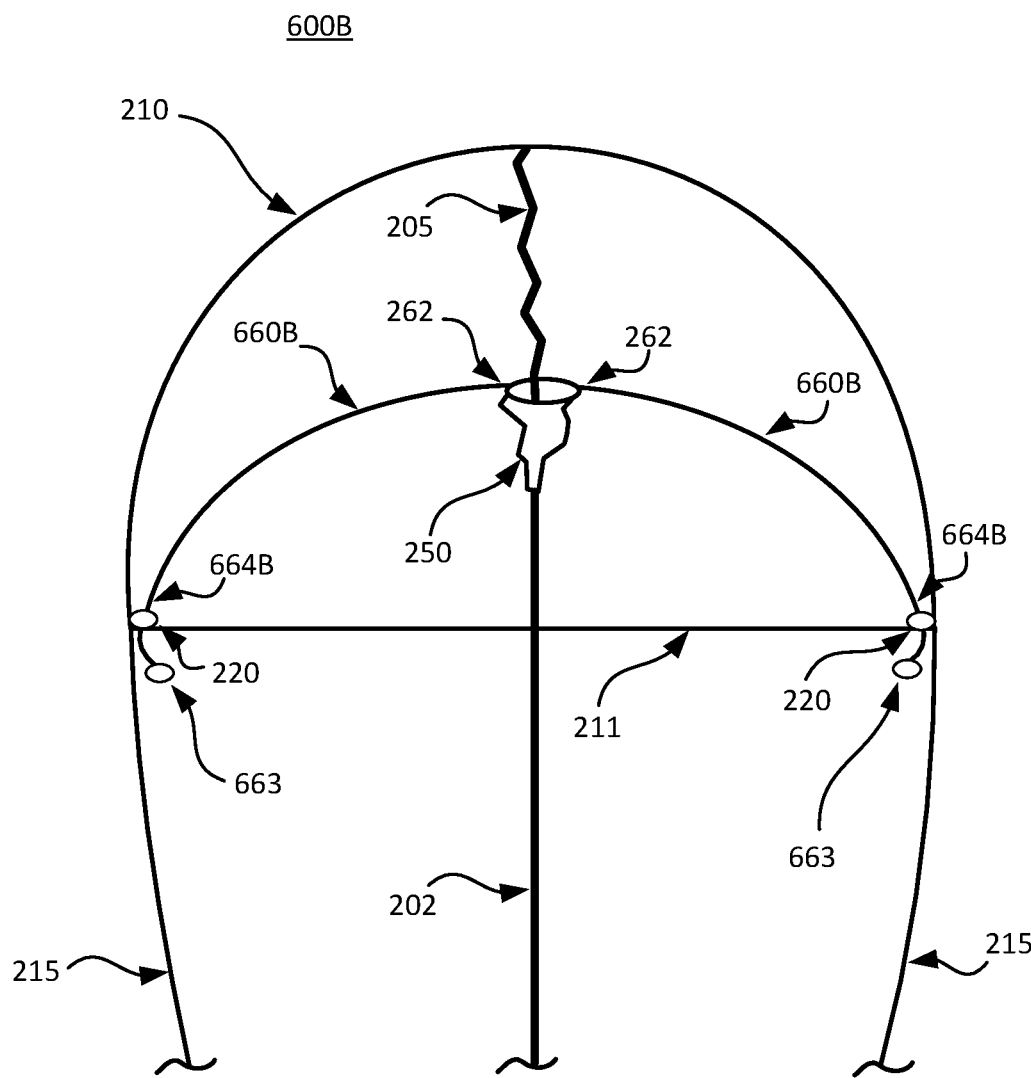
FIG. 6B illustrates a side view of a main parachute in a disreefed state coupled to a deflated inlet parachute having inlet control suspension lines in a second configuration in accordance with an exemplary embodiment.
Figure 6B:
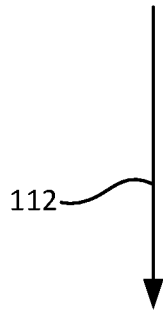

With reference to FIG. 6B depicting parachute system 600B, inlet control suspension lines 660B may be threaded through reefing rings 220, and comprise distal stops 663 coupled to distal inlet suspension line ends 664B. Inlet control suspension lines 660B may also comprise distal loops to facilitate coupling to an anchor point, or distal stops 663 may be distal loops. Distal stops 663 may allow inlet control suspension lines 660B to pass through reefing rings 220 in response to a disreefing event, but may prevent the entire length of inlet control suspension lines 660B from traveling therethrough. Distal stops 663 may be any object that is larger than a dimension of reefing rings 220 such that distal stops 663 may not pass through reefing ring 220. Therefore, for preparing parachute system 600B for reuse, inlet control suspension lines 660B may already be threaded through respective reefing rings 220, but the remaining length of inlet control suspension lines 660B may need to be threaded through reefing rings 220 and coupled to an anchor point.

Figure 6C:
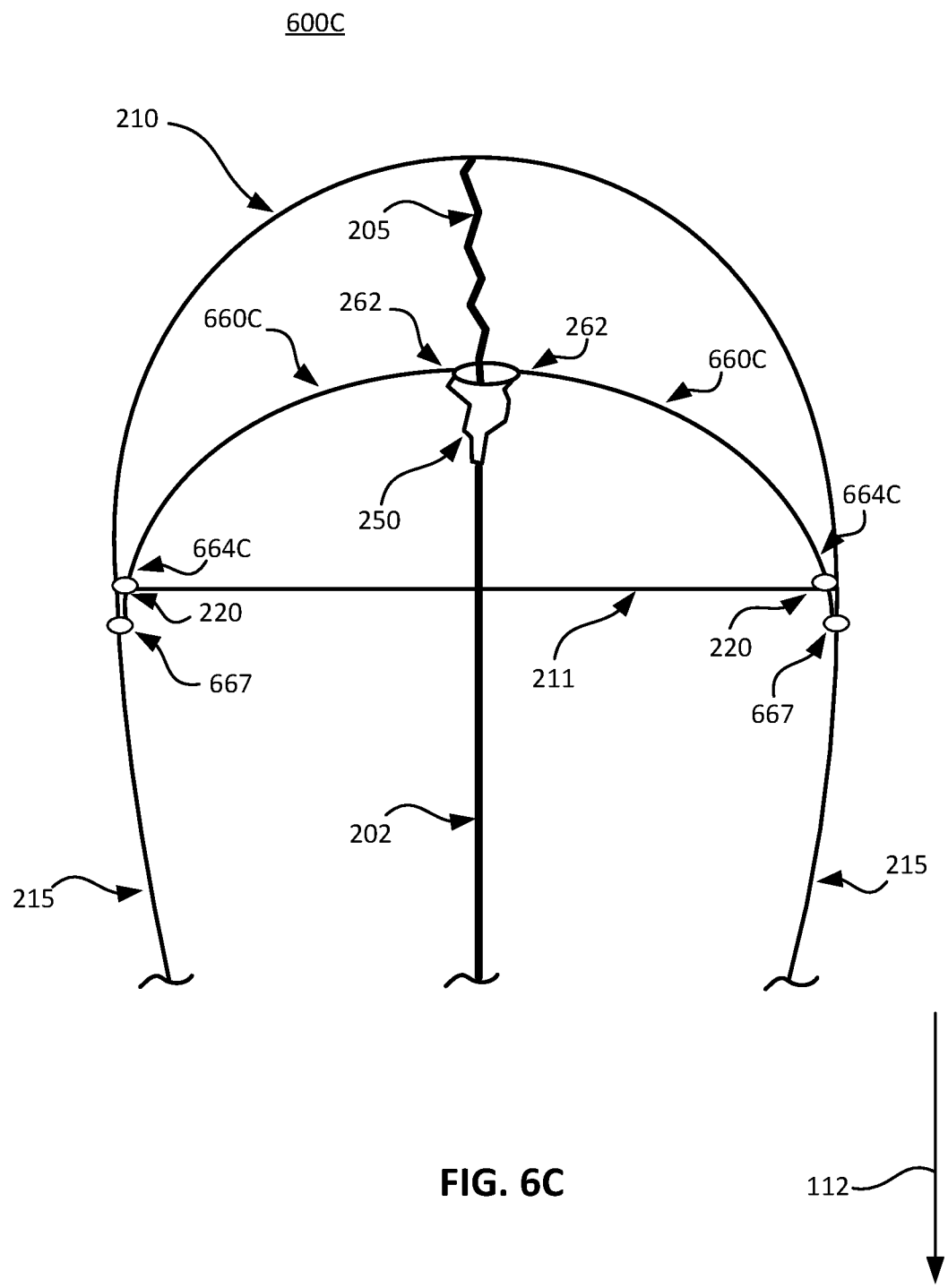
FIG. 6C illustrates a side view of a main parachute in a disreefed state coupled to a deflated inlet parachute having inlet control suspension lines in a third configuration in accordance with an exemplary embodiment.

With reference to FIG. 6C depicting parachute system 600C, inlet control suspension lines 660C may be threaded through reefing rings 220, and comprise distal stop loops 667 coupled to distal inlet suspension line ends 664C. Distal stop loops 667 may encircle main parachute suspension lines 215, such that, in response to a disreefing event, the length of inlet control suspension lines 660C travel upward through reefing rings 220, but distal stop loops 667 may prevent the entire length of inlet control suspension lines 660C from traveling therethrough. Distal stop loops 667 prevent further movement of inlet control suspension lines 660C through reefing rings 220 because distal stop loops 667 may travel no further up main parachute suspension lines 215 than the point at which main parachute canopy 210 meets main parachute suspension lines 215. Inlet control suspension lines 660C may also comprise distal loops to facilitate coupling to an anchor point, or distal stop loops 667 may be the distal loops simply wrapped around main parachute suspension lines 215. Therefore, for preparing parachute system 600C for reuse, inlet control suspension lines 660C may already be threaded through respective reefing rings 220, but the remaining length of inlet control suspension lines 660C may need to be threaded through reefing rings 220 and coupled to an anchor point.

Figure 6D:
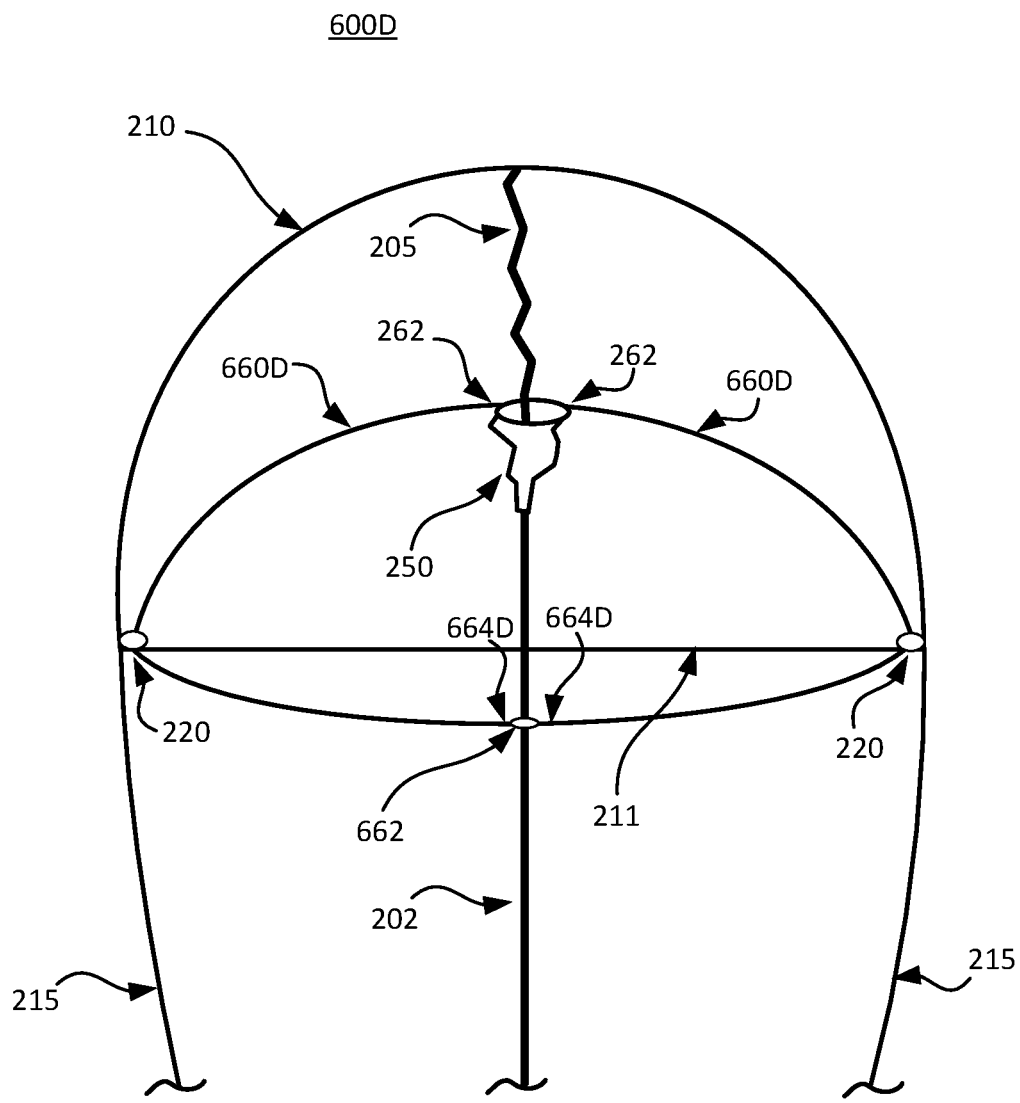
FIG. 6D illustrates a side view of a main parachute in a disreefed state coupled to a deflated inlet parachute having inlet control suspension lines in a fourth configuration in accordance with an exemplary embodiment.
Figure 6D:
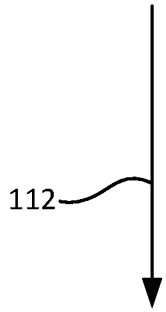

With reference to FIG. 6D depicting parachute system 600D, inlet control suspension lines 660D may be threaded through reefing rings 220. Inlet control suspension lines 660D may be coupled to one another at distal inlet suspension line ends 664D, for example, by coupling distal loops comprised on distal inlet suspension line ends 664D. The distal loops comprised on distal inlet suspension line ends 664D may be coupled by a coupling loop 662. Coupling loop 662 may be disposed around deflation line 202. In various embodiments, the distal loops comprised on distal inlet suspension line ends 664D may be disposed around a line, such as deflation line 202 or an anchor line without a separate coupling loop. In response to a disreefing event, a length of inlet control suspension lines 660D travels upward through reefing rings 220, until distal inlet suspension line ends 664D has reached the furthest upward point possible, at which point, any further length of inlet control suspension lines 660D is prevented from traveling through reefing rings 220. Accordingly, for preparing parachute system 600D for reuse, inlet control suspension lines 660D may already be threaded through respective reefing rings 220, but the remaining length of inlet control suspension lines 660D may need to be threaded through reefing rings 220 and coupled to an anchor point. But, in parachute system 600D, all inlet control suspension lines 660D may be moved to an anchor point with a single motion because they are all coupled together, or to a common line (e.g., deflation line 202 and/or an anchor line).

The parachute inlet control systems described herein comprising inlet control suspension lines coupled to an anchor point provide much simpler reefing systems. Preparing a parachute system comprising a parachute inlet control system for reuse may be a complicated endeavor, but the systems described herein, wherein inlet control suspension lines are simply threaded through reefing rings and coupled to an anchor point, can easily be reset for subsequent uses.

As noted previously, even a single parachute can suffer from lack of canopy air inlet control during the initial inflation phase, which can lead to a parachute malfunction, parachute damage, and/or loss of or damage to a payload. Accordingly, a parachute inlet control system, as described herein, may be coupled to a single main parachute to provide improved inflation and disreefing control.

Additionally, a parachute inlet control system, such as parachute inlet control system 301A, 301B, 301C, depicted in FIGS. 3A, 3B, and 3C-3E, respectively, may be configured to facilitate multiple reefing stages for a parachute, for example main parachute canopy 210. In accordance with various exemplary embodiments, a parachute inlet control system may function as the first reefing stage of main parachute canopy 210. Additional reefing systems may be provided on main parachute canopy 210 to obtain a multi-stage reefed inflation (e.g., a parachute inlet control system may comprise and/or facilitate multiple reefing stages). For example, main parachute canopy 210 may also be coupled to a second reefing line (e.g., a second stage of inlet control suspension lines and/or a second stage anchor line) that is longer than the respective lines for the first reefing stage. To progress to a subsequent reefing stage, the line(s) of the previous or current reefing stage may be severed or otherwise released. In this way, main parachute canopy 210 may achieve a multi-stage reefed inflation responsive to operation of a parachute inlet control system and one or more additional reefing lines, allowing main parachute canopy 210 to achieve a fully inflated configuration in stages.

Multi-stage inflation may be highly desirable, for example when main parachute canopy 210 is deployed when the associated payload is traveling at a high velocity.

Along similar lines, in various embodiments, to achieve multiple reefing stages, a reefing line or lines may be coupled to main parachute canopy 210, inlet parachute 250, and/or inlet control suspension lines 260. The reefing line may be provided with additional length other than the length under tension in a first reefing stage, such that to achieve a subsequent reefing stage, at least a portion of the additional length of the reefing line may be released, increasing the length of reefing line under tension. Such an increase in reefing line length may cause an additional portion of inlet control suspension lines 260 to travel upward through reefing rings 220, allowing main parachute skirt 211 to expand into a larger shape in the subsequent reefing stage than that of a previous reefing stage. For example, with reference to FIG. 3F, anchor line 203F (operative as a reefing line) may comprise additional length wrapped around reel 204F, or other device configured to control the release of additional anchor line length. Reel 204F may periodically or continuously release additional anchor line length to allow the parachute inlet control system to achieve subsequent reefing stages, or a gradually expanding reefing configuration. For example, reel 204F may comprise a disc brake configured to retain the additional anchor line length and release such line when desired. Reel 204F or other device to release additional anchor line length may be controlled mechanically and/or electronically, such as by remote control (e.g., using radio frequencies), and/or additional anchor line length may be released (e.g., automatically and/or on command) based on the payload altitude, velocity, atmospheric pressure, temperature, and/or the like.

In various embodiments, the reefing line, as discussed above, may be any suitable line (e.g., an anchor line, a retention line, inlet control suspension lines, and/or the like) which may be lengthened to extend the inlet parachute (e.g., inlet parachute 250) upward allowing main parachute skirt 211 to expand into a larger shape and main parachute 210 to inflate more fully.

Figure 3C:
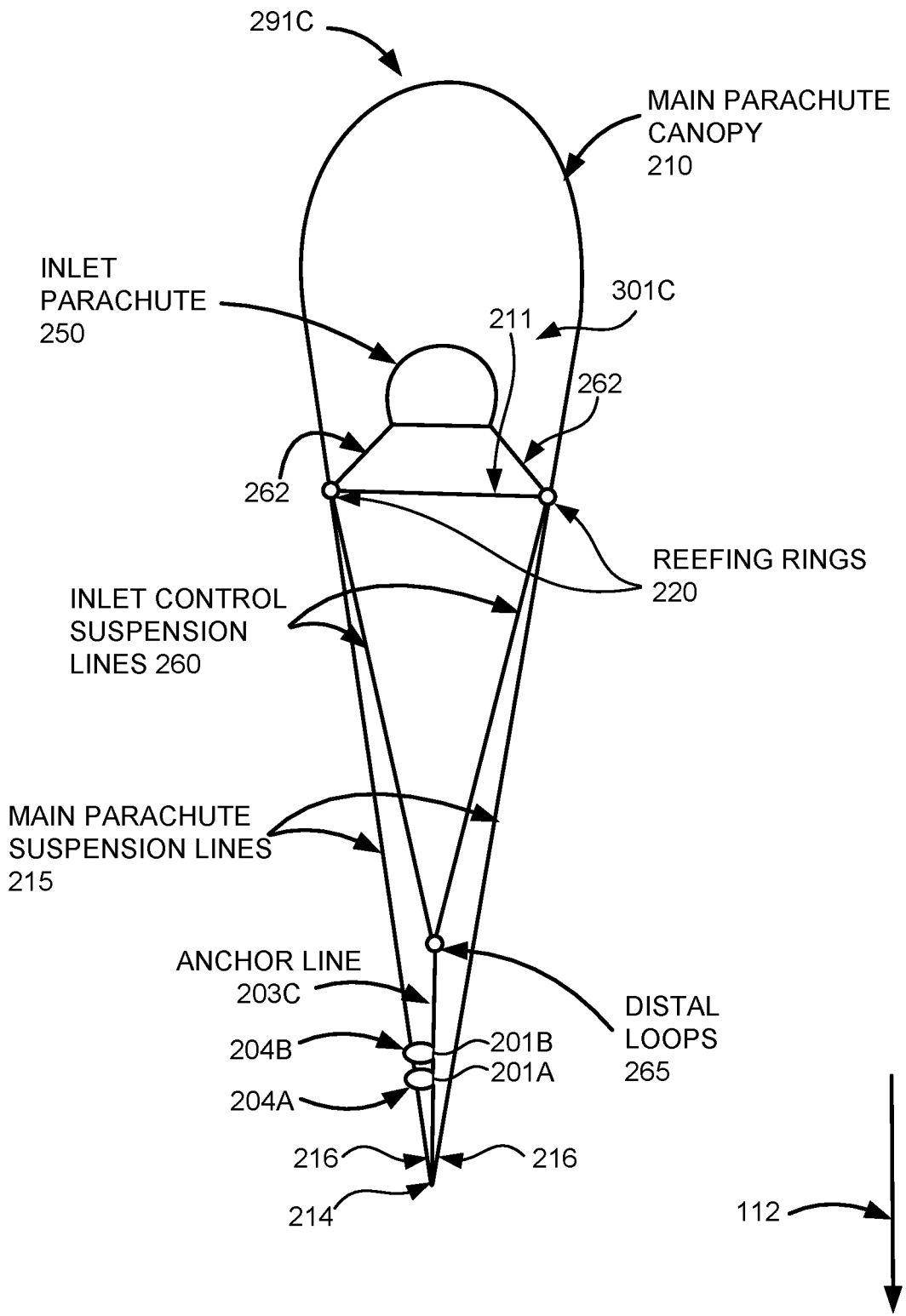
FIGS. 3C-3E illustrate a side view of a parachute system having a reefing system configured to facilitate multiple reefing stages in accordance with an exemplary embodiment.
Figure 3D:
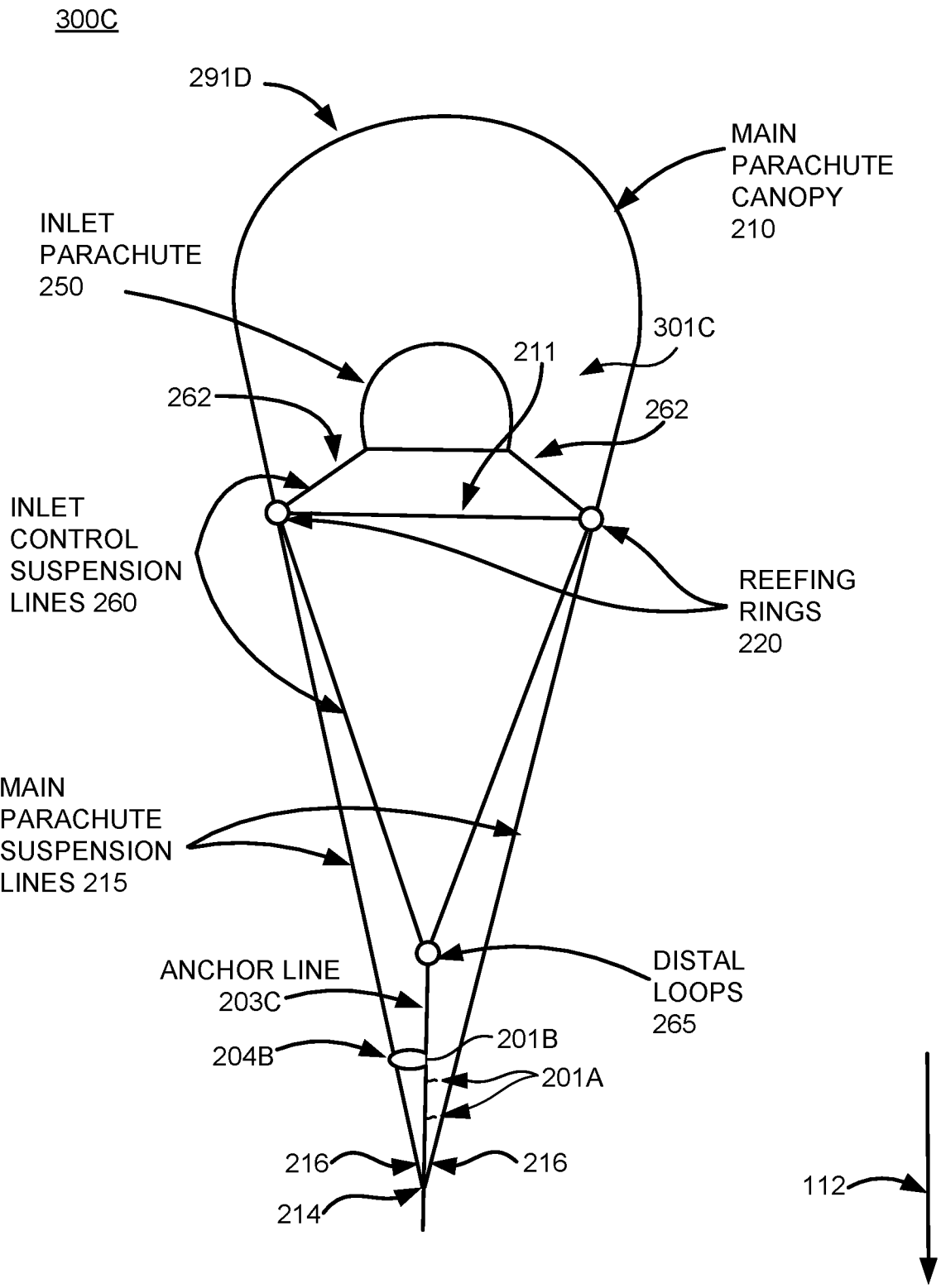
Figures 3E, 3F:
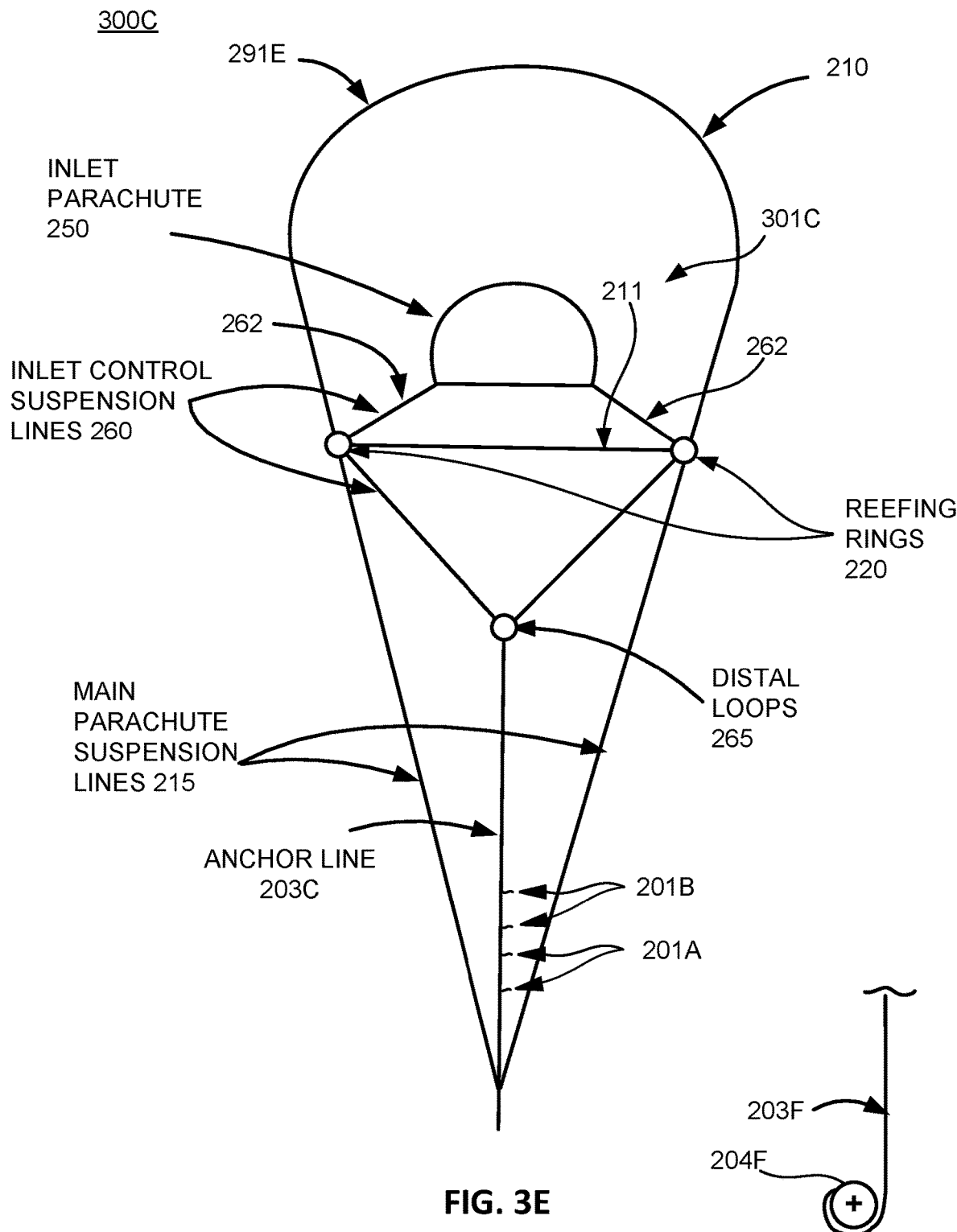
FIG. 3F illustrates a reel configured to be used in a parachute system having a reefing system configured to facilitate multiple reefing stages in accordance with an exemplary embodiment.

In various embodiments, with additional reference to FIGS. 3C-3E, a parachute inlet control system, such as parachute inlet control system 301C depicted in FIGS. 3C-3E, may be configured to facilitate multiple reefing stages for a parachute, for example main parachute canopy 210, via slack portions in the anchor line (e.g., anchor line 203C). Anchor line 203C may comprise one or more slack portions, such as slack portions 204A and 204B depicted in FIG. 3C. Slack portions 204A and 204B may be portions of anchor line 203C that are pinched by a line retention element (e.g., line retention elements 201A and 201B associated with slack portions 204A and 204B, respectively), such that anchor line 203C is shortened by the slack portions. Line retention elements (e.g., line retention elements 201A and 201B) may be a string, cord, or any other suitable structure, configured to couple two points of the anchor line (i.e., pinch two non-adjacent points) to form the slack portions (e.g., slack portions 204A and 204B). The line retention elements may be coupled to the anchor line at one or more points. There may be any suitable number of slack portions on an anchor line in a parachute inlet control system, each formed by a line retention element.

In various embodiments, parachute inlet control system 301C may comprise a line release component coupled to one or more line retention elements. In various embodiments, each line retention element may have a line release component coupled thereto. The line release component may be configured to sever the respective line retention element, or otherwise release the line comprised in the respective slack portion(s). The line release component may be similar to release component 101C, for example, a reefing cutter including any suitable configuration (remote-activated, timer-based, activated based on payload altitude, velocity, atmospheric pressure, temperature, and/or the like, etc.), discussed herein. For example, a reefing cutter may be coupled to each line retention element and configured to sever a respective line retention element. In response to such a severing, the line retention element may no longer pinch the portion of the anchor line forming the respective slack portion, thus allowing the slack portion to be brought under tension with the rest of the anchor line, adding length to the anchor line.

As an example of the operation of a parachute system having slack portions in the anchor line, as depicted in FIGS. 3C-3E, parachute system 300C may be in a first reefing stage 291C, wherein inlet parachute 250 is inflated and allows main parachute skirt 211 to open to a first size, giving main parachute canopy 210 a corresponding first reefing stage shape. Both slack portions 204A and 204B (and/or any other suitable number of slack portions) are disposed on anchor line 203C. In response to a line release component severing or otherwise releasing one or more of the slack portions, for example, severing line retention element 201A for slack portion 204A, the anchor line length comprised in slack portion 204A may be released from being pinched in slack portion 204A to join the rest of the length of anchor line 203C under tension, as shown in FIG. 3D, causing parachute system 300C to assume a second reefing stage 291D. That is, in response to the release of slack portion 204A by line retention element 201A (e.g., by being severed), the length of anchor line between an anchor point or convergence point 214 (at the bottom of anchor line 203C) and a distal loop 265 or other upper point of anchor line 203C increases by the length of slack portion 204A, which at this point in the example, is now released and under tension. FIG. 3D depicts severed portions of line retention element 201A. With anchor line 203C extended by the length of slack portion 204A, a portion of inlet control suspension lines 260 may move upwardly through reefing rings 220. Therefore, parachute system 300C assumes a second reefing stage 291D allowing main parachute skirt 211 to expand to a second size larger than the first size, giving main parachute 210 a corresponding second reefing stage shape.

Continuing with the example above, a second line retention element (e.g., line retention element 201B) may be severed or otherwise release another slack portion (e.g., slack portion 204B). The release of another slack portion may be a result of a command (e.g., communicated to the line release component by remote), operation of a timer, and/or a change in payload altitude, velocity, atmospheric pressure, temperature, or the like, and/or may be to allow the parachute system to assume a subsequent reefing stage. For example, referring to FIGS. 3D and 3E, line retention element 201B may be severed (severed line retention element 201B shown in FIG. 3E), releasing the anchor line comprised in slack portion 204B from being pinched in slack portion 204B to join the rest of the length of anchor line 203C under tension, as shown in FIG. 3E, causing parachute system 300C to assume a third reefing stage 291E. With anchor line 203C extended by the length of slack portion 204B, a portion of inlet control suspension lines 260 may move upwardly through reefing rings 220 (resulting in anchor line 203C being extended by the length of both slack portions 204A and 204B). Therefore, parachute system 300C assumes a third reefing stage 291E allowing main parachute skirt 211 to expand to a third size larger than the first size or the second size.

It will be appreciated that, in various exemplary embodiments, line releasing components of multiple parachute systems may receive a signal from a single command source, and take synchronized action responsive thereto, in order to effect synchronized payout of an anchor line (e.g., anchor line 203C). Moreover, it will be appreciated that any reefing/disreefing components described herein may receive a signal from a single command source, and take synchronized action responsive thereto, in order to effect synchronized payout of an anchor line (e.g., anchor line 203C) in multiple parachutes in a parachute cluster. In this manner, leading and/or lagging parachutes in a parachute cluster may be more effectively eliminated, and inflation of parachutes in a parachute cluster may be made more uniform, controlled, and reliable.

In various embodiments, a parachute system may comprise a parachute inlet control system having any suitable number of reefing stages, which may occur in sequence, enlarging the shape of a main parachute skirt (e.g., main parachute skirt 211), and further inflating the main parachute with each subsequent reefing stage. The reefing stages may occur until the main parachute is ready to be fully inflated. In various embodiments, more than one slack portion, or other additional length of a reefing line, in an inlet parachute inlet control system may be released at a time. In various embodiments, a number less than the total number of possible reefing stages may be completed during parachute deployment before the reefing process is ceased and/or before the main parachute is fully inflated.

In general, the coupling of one or more reefing rings to the skirt of a main parachute may be a weak link in the resulting parachute assembly. Stated another way, responsive to a sufficient force, one or more reefing rings may be ripped away from the main parachute.

Additionally, a main parachute may be configured without a reefing ring at one or more locations. Accordingly, a parachute inlet control system may be configured to reduce the force on one or more reefing rings associated with a main parachute and/or to interface with a main parachute having one or more locations without a reefing ring. In certain exemplary embodiments, a parachute inlet control system is configured to interface with a main parachute having no reefing rings.

As will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A parachute inlet control system, comprising:
   an inlet parachute; and
   a reefing component comprising a first inlet control suspension line and a second inlet control suspension line each having a proximal end coupled to the inlet parachute;
   wherein the first inlet control suspension line is threaded through a first reefing ring coupled to a main parachute canopy,
   wherein the second inlet control suspension line is threaded through a second reefing ring coupled to the main parachute canopy, wherein each of the first inlet control suspension line and a second inlet control suspension line have a distal end that is coupled to an anchor point, and wherein the anchor point is located, when the first inlet control suspension line and the second inlet control suspension line are under tension arising from inflation of the inlet parachute, at a location below the skirt of the main parachute canopy in the downward direction.

2. The system of claim 1, further comprising a release component coupled to the distal inlet line suspension line end of at least one inlet suspension line of the plurality of inlet control suspension lines, wherein the release component is configured to cause separation of the inlet parachute from the main parachute canopy.

3. The system of claim 2, further comprising a deflation line coupled to the inlet parachute and extending in the downward direction, wherein the deflation line is coupled to a fixed point below the anchor point to prevent the inlet parachute canopy from contacting the main parachute canopy responsive to activation of the release component.

4. The system of claim 3, wherein the anchor point is coupled to or disposed on the deflation line.

5. The system of claim 2, wherein the release component comprises a cut loop, and wherein the distal end of the first inlet control suspension line and the distal end of the second inlet control suspension line are coupled to the anchor point by the cut loop.

6. The system of claim 5, wherein the distal end of the first inlet control suspension line comprises a distal loop coupled to the cut loop.

7. The system of claim 6, wherein the distal loop is configured to pass through a respective reefing ring in response to the reefing cutter separating the inlet parachute from the main parachute canopy.

8. The system of claim 1, wherein the first inlet control suspension line does not pass through or thread around any portion of the second inlet control suspension line.

9. The system of claim 1, wherein the distal end of the first inlet control suspension line comprises a first distal stop, and wherein the first distal stop is larger than the first reefing ring such that the first distal stop may not pass through the first reefing ring.

10. The system of claim 1, wherein the distal end of the first inlet control suspension line comprises a first distal loop configured to be disposed around a main parachute suspension line coupled to the main parachute canopy.

11. The system of claim 1, wherein the distal end of the first inlet control suspension line and the distal end of the of the second inlet control suspension line are coupled to one another and to the anchor point via a coupling loop.

12. The system of claim 1, wherein the release component is configured to operate responsive to at least one of: an activation command received by the release component, a predetermined time period, altitude of the parachute inlet control system, or velocity of the parachute inlet control system.

13. A method for inflating a parachute, the method comprising:

coupling an inlet parachute to a main parachute via a plurality of inlet control suspension lines threaded through a plurality of reefing rings coupled to the main parachute, wherein the inlet control suspension lines each comprise a proximal inlet line end coupled to the inlet parachute and a distal inlet line end extending in a downward direction, wherein the inlet parachute is configured to inflate within the inlet area of the main parachute, and wherein the distal inlet line ends of the inlet control suspension lines are coupled to an anchor point that is located, when the plurality of inlet control suspension lines are under tension arising from inflation of the inlet parachute, outside the skirt of the main parachute and in a downward direction from the main parachute; and inflating the inlet parachute.

14. The method of claim 13, wherein, responsive to the inflating, the inlet control suspension lines extend from the inlet parachute and reefing rings in a downward direction to the anchor point beyond the skirt of the main parachute.

15. The method of claim 13, wherein the anchor point is disposed on a suspension line of the main parachute.

16. The method of claim 13, further comprising activating a release component coupled to the distal inlet line end of at least one of the inlet control suspension lines.

17. The method of claim 16, wherein the distal inlet line end is coupled to the release component and the anchor point via a cut loop, and wherein the method further comprises:

severing the cut loop in response to activating the release component; and separating the inlet control suspension lines of the inlet parachute from the main parachute canopy in response to the severing the cut loop.

18. The method of claim 16, further comprising:

separating the inlet parachute from the main parachute canopy in response to the activating the release component;

deflating the inlet parachute in response to the separating the inlet parachute from the main parachute; and inflating the main parachute canopy fully in response to the separating the inlet parachute from the main parachute.

* * * * *